United States Patent [19]
Chen et al.

[11] Patent Number: 5,928,588
[45] Date of Patent: Jul. 27, 1999

[54] POROUS FILTER STRUCTURE AND PROCESS FOR THE MANUFACTURE THEREOF

[75] Inventors: Wei-Chih Chen, Meriden; Ronald V. Repetti, Guilford, both of Conn.; Jack Slovak, Incline Village, Nev.

[73] Assignee: Cuno, Incorporated, Meriden, Conn.

[21] Appl. No.: 08/969,919

[22] Filed: Nov. 13, 1997

Related U.S. Application Data

[62] Division of application No. 08/711,500, Sep. 10, 1996.

[51] Int. Cl.$^6$ .............................. B29C 43/02; B29C 67/00
[52] U.S. Cl. .......................... 264/113; 264/122; 264/126; 264/913
[58] Field of Search .................................. 264/113, 118, 264/122, 126, DIG. 48, 913

[56] References Cited

U.S. PATENT DOCUMENTS

| | | | |
|---|---|---|---|
| 3,919,369 | 11/1975 | Holden | 264/45.1 |
| 4,007,113 | 2/1977 | Ostreicher | 210/23 |
| 4,007,114 | 2/1977 | Ostreicher | 210/23 |
| 4,305,782 | 12/1981 | Ostreicher | 162/181 |
| 4,309,247 | 1/1982 | Hou et al. | 162/149 |
| 4,629,483 | 12/1986 | Stanton | 55/487 |
| 4,664,683 | 5/1987 | Degen et al. | 55/387 |
| 4,859,386 | 8/1989 | VanderBilt et al. | 264/113 |
| 5,017,318 | 5/1991 | VanderBilt et al. | 264/113 |
| 5,019,311 | 5/1991 | Koslow | 264/122 |
| 5,225,131 | 7/1993 | Tamaru et al. | 264/113 |
| 5,266,536 | 11/1993 | Egerton et al. | 501/127 |
| 5,340,655 | 8/1994 | Creber et al. | 428/446 |
| 5,443,735 | 8/1995 | Kirnbauer et al. | 210/668 |
| 5,505,892 | 4/1996 | Domme | 264/122 |
| 5,656,069 | 8/1997 | Nikolkaja et al. | 264/122 |
| 5,665,234 | 9/1997 | Dilenge et al. | 210/496 |
| 5,688,347 | 11/1997 | Connolly et al. | 156/89 |
| 5,730,918 | 3/1998 | Nikolskaja et al. | 264/119 |

FOREIGN PATENT DOCUMENTS

| | | |
|---|---|---|
| 0 666 095 A1 | 8/1995 | European Pat. Off. . |
| 0 384 716 B1 | 1/1996 | European Pat. Off. . |
| 60238115 | 11/1985 | Japan . |
| 06170132 | 6/1994 | Japan . |

*Primary Examiner*—Mary Lynn Theisen
*Attorney, Agent, or Firm*—Renner, Kenner, Greive, Bobak, Taylor & Weber

[57] ABSTRACT

A process for the manufacture of porous structures comprises forming a dry mixture comprising a component providing primary separation capability, a component providing green strength reinforcement capability and, a component providing binding capability and selected from the group consisting of thermoplastic and thermosetting polymers; delivering the mixture to a suitable surface and building a desired thickness thereof; densifying the mixture into tile form desired for the porous structure; removing the densified porous structure from the surface; binding the component providing the primary separation capability by melting the mixture to a temperature of up to about 20° C. higher than the melting point of any thermoplastic component providing binding capability. Porous structures (100, 110, 120, 125, 140, 175) according to the present invention comprise from about 70 to about 90 parts by weight of a component providing primary separation capability (61, 62); from about one to about 15 parts by weight of a component providing green strength reinforcement capability (64, 65); and, from about eight to about 20 parts by weight of a component providing binding capability (67, 68) and selected from the group consisting of thermoplastic and thermosetting polymers.

31 Claims, 13 Drawing Sheets

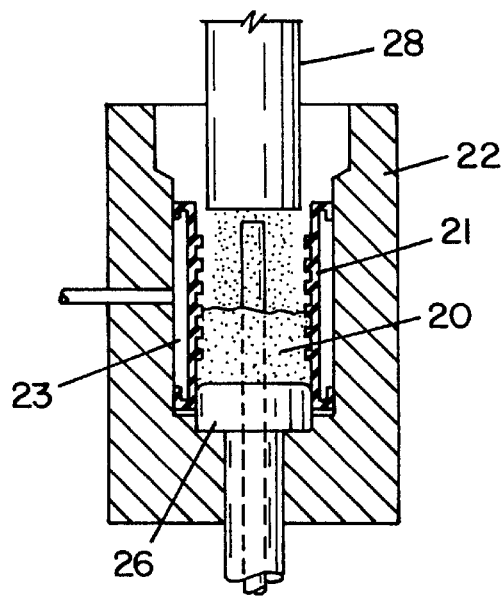
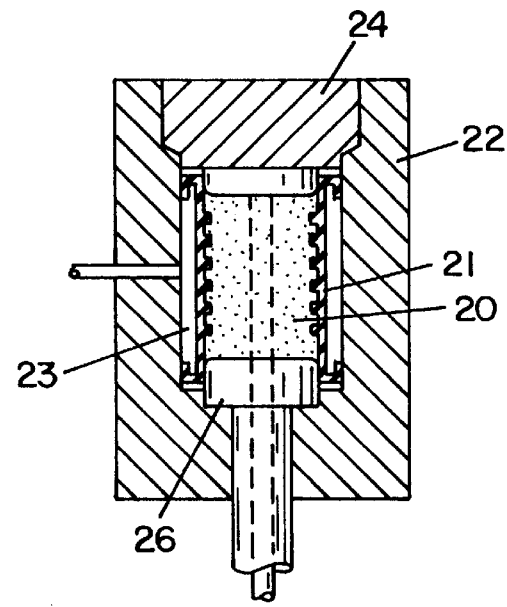
FIG. 1A
FIG. 1B
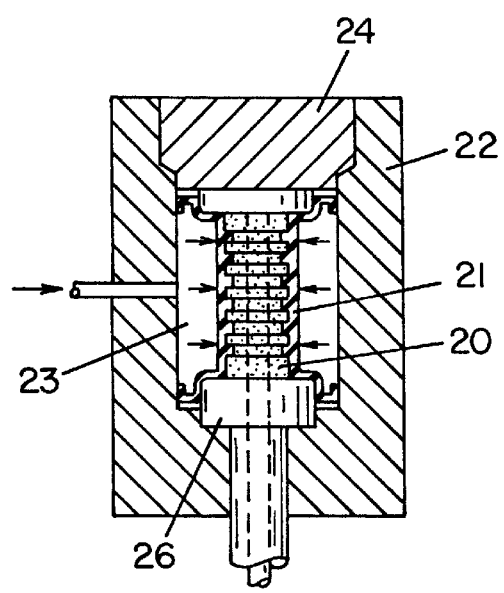
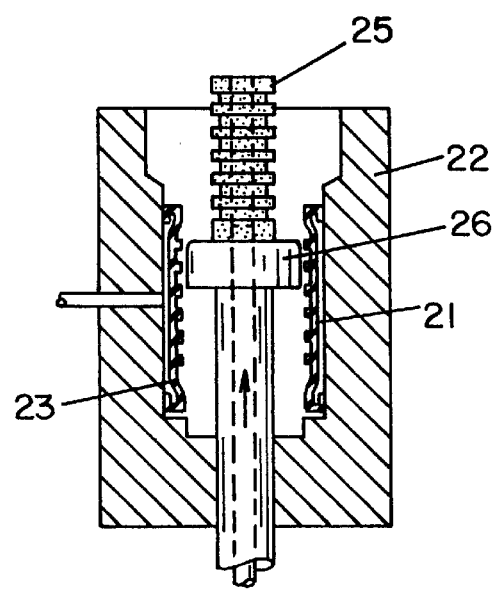
FIG. 1C
FIG. 1D

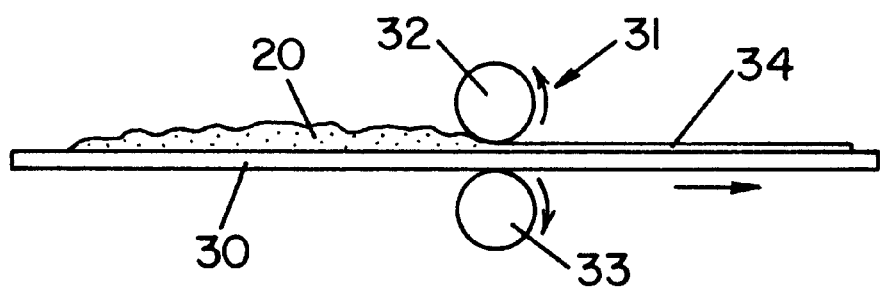
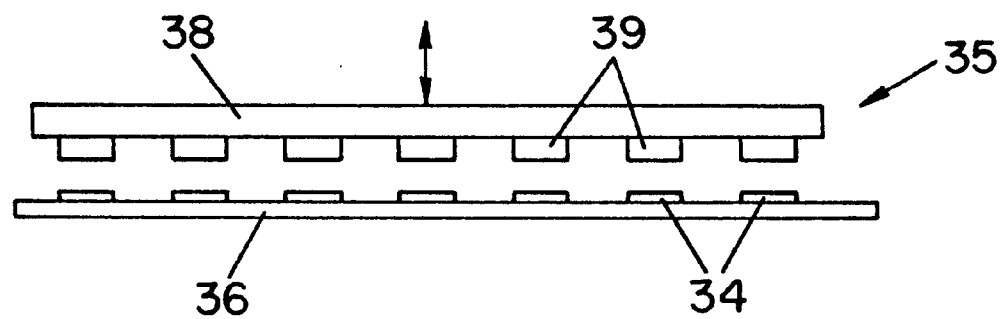
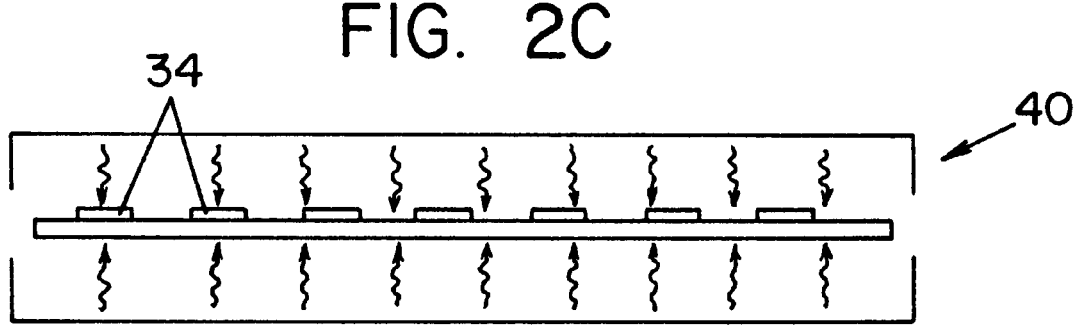

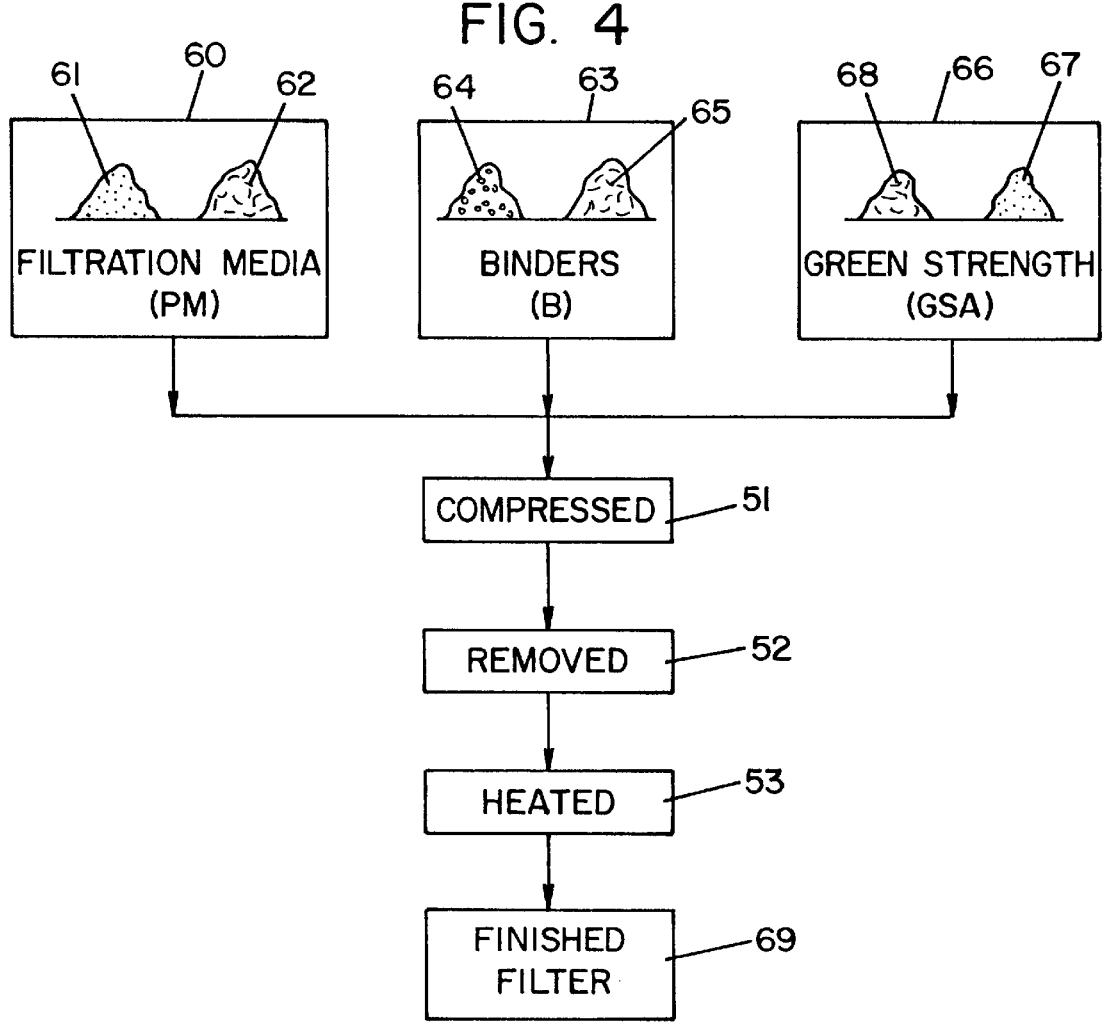

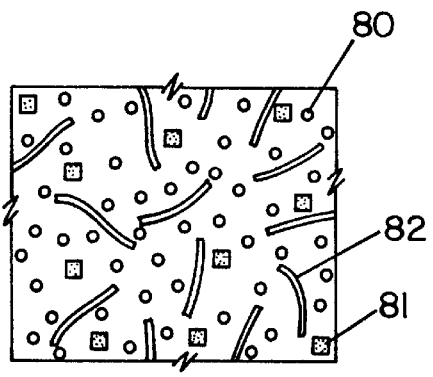 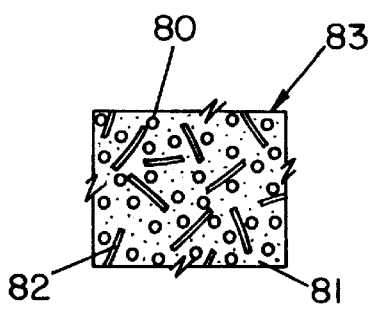
FIG. 5A  FIG. 5B
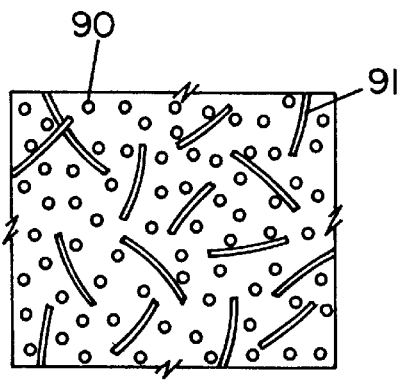 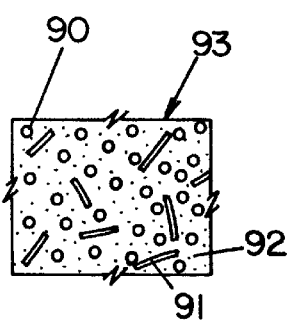 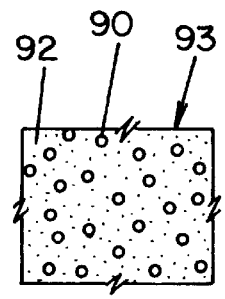
FIG. 6A  FIG. 6B  FIG. 6C
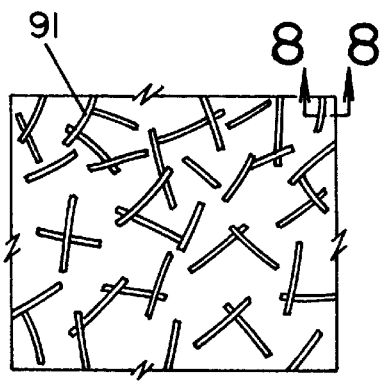 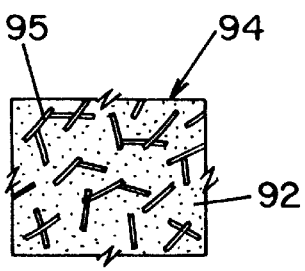
FIG. 7A  FIG. 7B FIG. 8
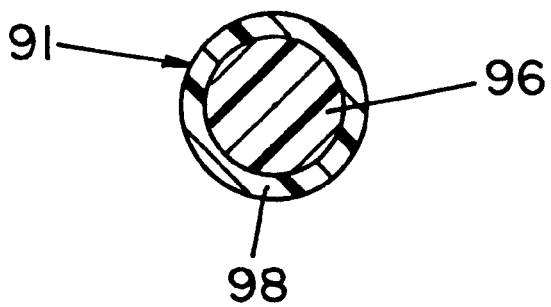
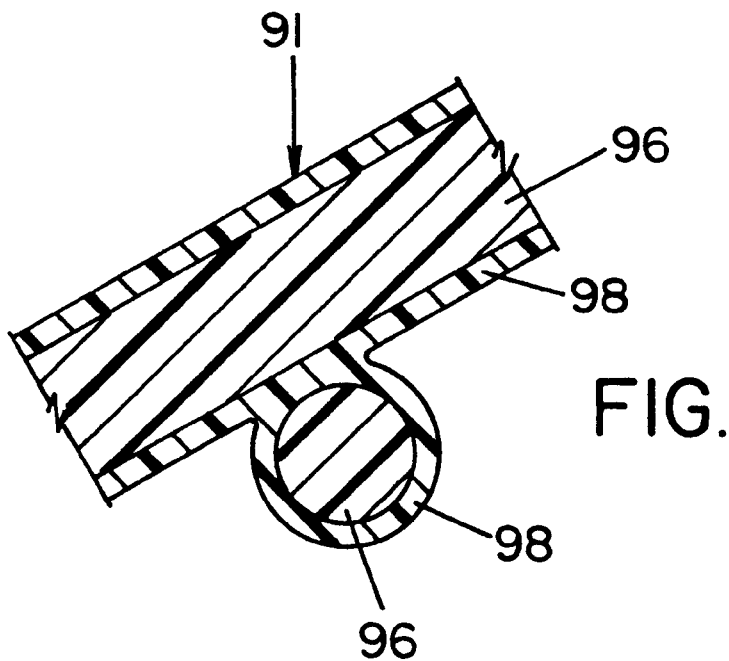
FIG. 9

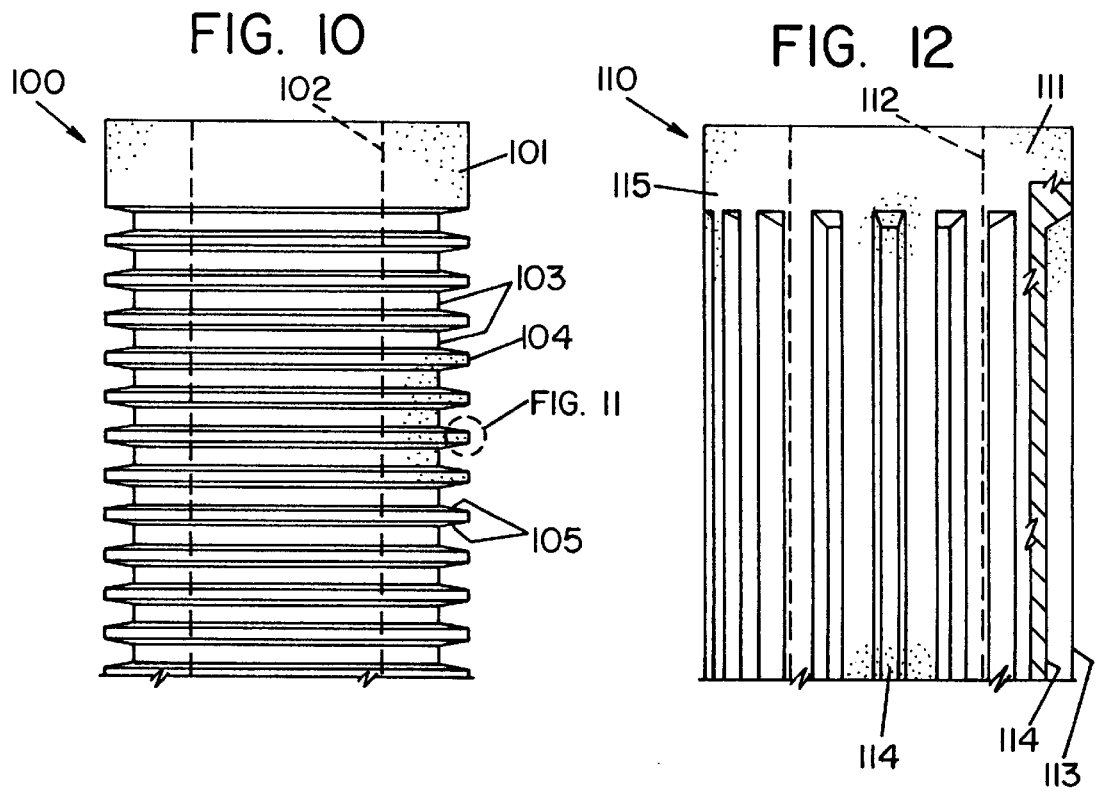

POROUS FILTER STRUCTURE AND PROCESS FOR THE MANUFACTURE THEREOF

This application is a division of application Ser. No. 08/711,500, filed Sep. 10, 1996.

TECHNICAL FIELD

This invention relates to porous structures for the separation of fluids from unwanted constituents. Typically, media of this type contain filter aids and are manufactured in the form of hollow core cylindrical blocks or flat sheets. In use, fluid to be separated is directed through the porous filter structure, after which it is withdrawn. The present invention additionally provides a process for the manufacture of such porous structures.

BACKGROUND OF THE INVENTION

Typical separation medias include diatomaceous earth, perlite, activated carbon, zeolites and the like, to achieve filtration of adsorption effects. Use of such components in powdered form often generates high pressure drop and/or channeling. Accordingly, powdered filter aids are put into useful forms by a) incorporating them into thin media such as papers, or by depositing them as a thin pre-coat on a substrate to avoid high pressure drop; or b) combining them with a binder so they can subsequently be made into a useful porous structure.

Molded porous filter structures made from the typical separations media could be improved if the amount of binder could be reduced from the usual 20 to 40 percent and if the molded object could be removed from the high pressure compression mold, i.e. if it had high green strength, and subsequently thermally bonded in a self-supporting condition. Porous filter structures can be made by an extrusion process, but such processes are slow and require a large number of extruders for commercial production. Moreover, such processes are limited in the shape of useful filter structures that can be made.

Filter structures can be made via wet or dry processing. An example of the wet process is U.S. Pat. No. 5,443,735 issued to Pall Corporation which relates to the manufacture of so-called immobilized carbon beds. Several methods are disclosed, one of which produces a radial flow pressed block filter by mixing a wet slurry of fibrous materials, activated carbon and an adhesive; pumping the slurry into a mold; pressing out the free water; removing the pressed block from the mold and heating the block to remove moisture; and adding filter materials. Another produces an axial flow filter involving the mixing of carbon particulate and fine powdered polyethylene resin; the mixture being subsequently heated to melt the polymer and join the carbon particles. The invention is based upon the use of fine brass particles to aid in the inhibition of microbial growth in water.

In the dry process, the components are first dry blended, followed by densification and heating of the dry mixture into different forms and shapes. The current state of the dry process art is exemplified by the following patents. U.S. Pat. No. 4,664,683 issued to Pall Corporation teaches the use of molding carbon blocks with particle sizes from about 200 to 2000 microns. The maximum molding pressure is 400 psi. The particle size of the polyethylene powdered binder employed is about 8 to 30 microns. The preferred binding pressure is from 0.3 to 10 psi. The binding temperature is about 50 to 90° F. (28 to 50° C.) above the Vicat softening temperature. These temperatures are equal to or below the melting temperature of the binder. The carbon and binder mixture is heated within the mold and then pressed for 1 to 2 minutes. The cooled carbon block is removed from the mold and found to be self-supporting. The filter blocks have poor physical strength due to the lack of efficient binding between the binder and the carbon particles.

U.S. Pat. No. 4,859,386 issued to Amway Corporation teaches a method for making a molded composite charcoal filter having two shells including the use of ultra-high molecular weight polyethylene as a binder, having a very low melt flow index, on the order of $\leq 1$ gram/10 minutes, at a level of between 20 and 35 percent by weight. Binders having a high melt flow index are proclaimed as causing blinding of the active sites of the activated carbon. The patent teaches that while the blocks are still in the mold, they are subjected to heat (175 to 205° C.) and pressure (30 to 120 psi) to form a bonded integral composite filter. The drawback of this type of block is weak physical strength due to poor melt flow of the binder. At temperatures just a few degrees above the melting temperature (135 to 138° C.), the block has very poor physical strength. The method relies on raising the temperature to 175 to 205° C. to increase melt flow, which is avoided in the first place, in order to improve binding strength.

U.S. Pat. No. 5,019,311 issued to KT Corporation teaches a similar process, which employs a blend of conventional binders having medium and high melt flow index. These conventional binders are stretched out into a "continuous web matrix" (CWM) by the shearing forces encountered during material blending before extrusion without blocking the active sites, at a temperature substantially above the softening point of the binder. As a result, the required amount of binder can be reduced significantly to about 8 to 20 percent by weight. During the extrusion process, the media is in contact with the barrel and the screw. The extruded media is very hot and soft and must be hardened by rapid cooling to allow for subsequent handling. The typical binder, ethylene-vinyl acetate copolymer (EVA), used in this invention is sheared at a minimum of 145° C., which is at least 30° C. higher than the melting temperature (115° C.). The binder is stretched and spread onto the carbon particles to give good binding strength. However, this process can blind off an excessive number of pores of the carbon. Moreover, the carbon adsorption capacity and efficiency are very sensitive to the temperature variation and shear force of this process.

Thus, while attempts have been made heretofore to manufacture porous structures containing fine particle size filter aids, the art has not provided a facile process by which to combine relatively low amounts of binder resin with fine particles to produce a block having good green strength and favorably low pressure drop during fluid separation or filtration.

SUMMARY OF INVENTION

It is therefore, an object of the present invention to provide a process for the manufacture of porous structures.

It is another object of the present invention to provide a process for the manufacture of porous structures comprising fine fibrous and particulate separation materials and binders.

It is yet another object of the present invention to provide porous structures comprising fine separation materials and binders.

It is yet another object of the present invention to provide porous structures providing adsorptive and non-adsorptive media.

It is yet another object of the present invention to provide porous structures comprising greater amounts of separation materials and respectively lower amounts of binders, without sacrificing green strength.

It is yet another object of the present invention to provide a process for the manufacture of porous structures which have greater amounts of separation materials and respectively lower amounts of binders, without sacrificing green strength.

At least one or more of the foregoing objects, together with the advantages thereof over the known art relating to porous structures and processes for the preparation thereof, which shall become apparent from the specification which follows, are accomplished by the invention as hereinafter described and claimed.

In general, the present invention is directed toward a process for the manufacture of porous structures comprising forming a dry mixture comprising a component providing primary separation capability, a component providing green strength reinforcement capability and, a component providing binding capability and selected from the group consisting of thermoplastic and thermosetting polymers; delivering the mixture to a suitable surface and building a desired thickness thereof; densifying the mixture into the form desired for the porous structure; removing the densified porous structure from the surface; binding the component providing the primary separation capability by heating the mixture to a temperature of up to about 20° C. higher than the melting point of any thermoplastic component providing binding capability.

The present invention also provides porous structures comprising from about 70 to about 90 percent by weight of a component providing primary separation capability; from about one to about 15 percent by weight of a component providing green strength reinforcement capability; and, from about eight to about 20 percent by weight of a component providing binding capability and selected from the group consisting of thermoplastic and thermosetting polymers.

BRIEF DESCRIPTION OF THE DRAWINGS

FIGS. 1A–1D provide a series of steps depicting one means for compressing components in the manufacture of porous structures, according to the present invention;

FIGS. 2A–2C provide a series of steps schematically depicting another means for compressing components in the manufacture of porous structures, according to the present invention;

FIG. 4 is a diagrammatic depiction of various combinations of components and the processing steps for the manufacture of porous structures according to the present invention;

FIGS. 5A–5B provide sequentially a schematic depiction of three components combined for the manufacture of porous structures prior to compression and heating in FIG. 5A and subsequent to compression and heating in FIG. 5B, according to the present invention;

FIGS. 6A–6C provide sequentially a schematic depiction of two components combined for the manufacture of porous structures prior to compression and heating in FIG. 6A and subsequent to compression and heating in FIGS. 6B and 6C, according to the present invention;

FIGS. 7A–7B provide sequentially a schematic depiction of one component for the manufacture of porous structures prior to compression and heating in FIG. 7A and subsequent to compression and heating in FIG. 7B, according to the present invention;

FIG. 8 is an enlarged cross-section, taken substantially along the lines 8—8 of FIG. 7, of a multi-component polymer fiber which can be employed for the manufacture of porous structures according to the present invention;

FIG. 9 depicts two multi-component polymer fibers employed for the manufacture of porous structures according to the present invention showing a portion of the outer polymer sheaths from each fiber melted together;

FIG. 10 is a partial side elevation of a porous structure according to the present invention;

FIG. 11 is an enlarged view of the area circled in FIG. 10;

FIG. 12 is a partial side elevation of another porous structure according to the present invention;

FIG. 13 is a partial side elevation of another porous structure according to the present invention;

FIG. 22 is a graph comparing the effect on the green strength of porous structures, according to the present invention, with increasing amounts of additive polyethylene fiber.

PREFERRED EMBODIMENT FOR CARRYING OUT THE INVENTION

Figure 3A:
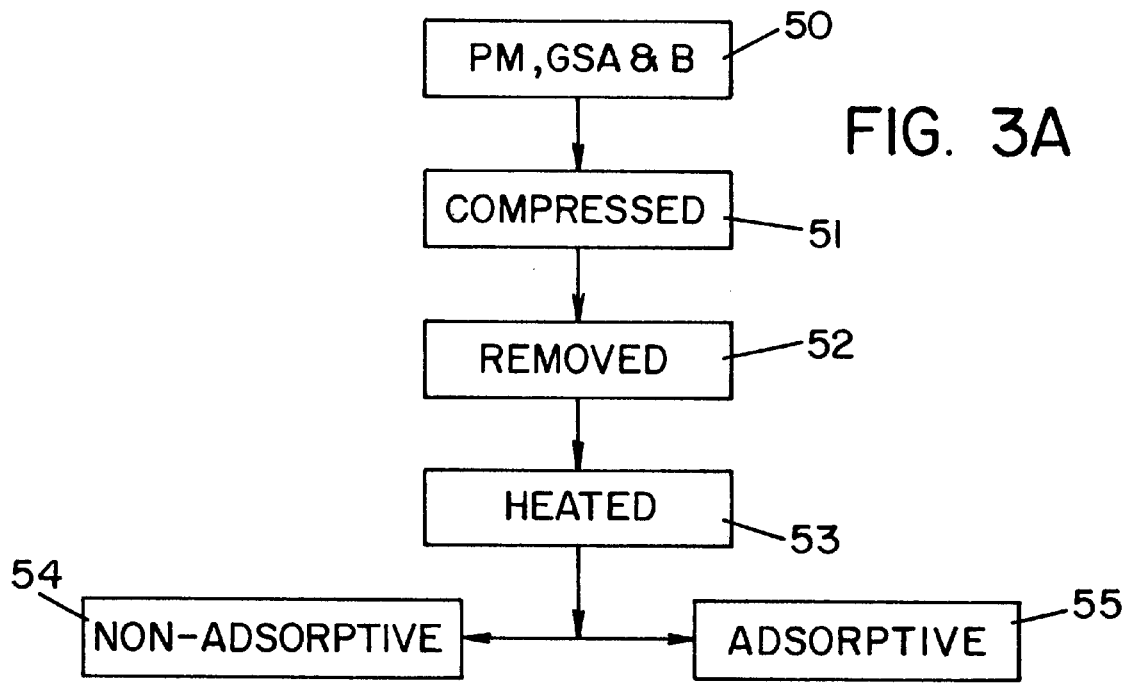
FIGS. 3A–3B are block diagrams depicting various combinations of steps for the manufacture of porous structures according to the present invention.

The present invention relates to the manufacture of porous structures, useful in separation, particularly filtration applications, and to a new and useful form of blocks and other configurations thereof. The porous structures comprise 1) a component providing primary separation capability, or primary media (PM); 2) a component providing green strength reinforcement, or the green strength agent (GSA); and, 3) a component providing binding capability or, binder (B). One or more types of each component can be combined. Optional components (4) include various additives, as will be described hereinbelow. The optional additives normally do not change the main functions of PM, GSA, and B. However, the additive can become part of the PM, GSA, and/or B when the contribution of the additive is significant.

With respect to the primary separation media, it can be one or several types of particles or fibers in mixtures that function as the porous matrix. Preferably, the primary media is selected from the group consisting of carbon particles, diatomaceous earth, perlite, activated alumina, silica, zeolites, natural fibers, and man made fibers. Powdered carbon is typically selected to form a carbon block porous structure and comprises 10 to 400 microns particle size. For a general description of suitable carbon, see U.S. Pat. No. 4,859,386, the subject matter of which is incorporated herein by reference. Activated carbon is available from Calgon, Barnebey and Sutcliffe, etc. Sizes for the other particulate media are generally well known to those skilled in the art and thus, do not constitute a limitation to the practice of the present invention. Similarly, fiber dimensions, i.e., denier, length, diameter and the like can also be varied as is known for the manufacture of various porous structures based upon fibrous media.

Regarding fibers, the natural species include cellulose such as cotton and wood pulp, wool, jute, hemp and the man-made varieties include the polyolefin fibers from monomers having from two to about five carbon atoms, such as polyethylene and polypropylene, as well as polyester, carbon, graphite, glass, acrylics, rayon, nylon and aramid fibers. In some instances, multi-component fibers having a polypropylene or polyester core and lower melting polyethylene sheath can be selected, as will be discussed hereinbelow. Such fibers are commercially available and one example comprises a high density polyethylene (HDPE) sheath and a polypropylene (PP) core.

The primary media can also include certain plastic powders, including the polyolefins, resulting from monomers having from two to about five carbon atoms, such as polyethylene and polypropylene, as well as polystyrene, polyvinyl chloride, polycarbonate, polysulfone, nylon and polyester. As should now be apparent, some species of primary media are non-meltable, or at least do not melt during manufacture of the porous structure, while other species can and do melt, partially or totally. Where the primary media does not melt, adsorptive porous media can be made; however, both adsorptive and non-adsorptive porous media can be made from both meltable and non-meltable primary media, which will be explained in greater detail hereinbelow.

Examples of adsorptive non-melting or non-melted primary media include activated carbon, ion exchange resins, alumina and zeolites. Examples of non-adsorptive non-melting or non-melted primary media include natural and synthetic fibers. Examples of non-adsorptive media made from meltable primary media include multi-component fibers.

As for the green strength agent, fibers and powders can be employed. While powders are less effective, fine fibers are more effective than coarse fibers. Straight or crimped fibers are less effective than fibrillated fibers. Soft fibers are more effective than rigid fibers. The preferred fibers are fibrillated or micro-fibers, selected from the group consisting of polyolefin fibers, such as polyethylene and polypropylene, polyesters, nylons, aramids and rayons. These fibers can function additionally as binders if melted, or as part of the porous matrix, depending on their physical and chemical natures and porous condition. The preferred diameter of these types of fibers is less than 100 microns, but is not limited. The amount of the green strength agent and the compressing pressures are the processing variables for a specific formulation.

Other types of green strength agents include liquid green strength agents such as latexes and resin solutions. Styrene-butadiene, poly(ethylene-vinyl acetate), and acrylate types of latexes are good candidates. Aqueous resin solutions made of water soluble polymers, such as methyl-cellulose and hydroxypropyl methyl-cellulose, carboxymethyl cellulose, hydroxyethyl cellulose, polyvinyl alcohol, polyvinyl pyrrolidone, polyacrylic acid, polyethylene oxide, polyethyleneimine, polyacrylamide, natural gums and their copolymers and derivatives can also be employed, separately or in mixtures. Even small amounts of water can be used to soften the dry powdered thermosetting binder resins, such as phenol-formaldehyde and melamine-formaldehyde resins, to improve green strength and thus, water can be employed as a green strength agent.

The binder material can be in the form of powder or fibers or mixtures thereof, with thermoplastic and thermosetting plastics being preferred. The fibrous binders may include multi-component and fibrillated fibers and may also possess some separation properties. The binder is preferred to have medium melt indices, in order to improve physical strength, reduce melt flow, and reduce the time required for thermally bonding the media. The preferred melt index is >1 gram per 10 minutes (ASTM 1238 method) up to about 20 grams per 10 minutes for adsorptive and absorptive media.

More particularly, the powder materials are selected from the group consisting of polymeric powders, resulting from monomers having from two to about five carbon atoms, such as the polyolefins e.g., polyethylene and polypropylene; as well as epoxy, phenol-formaldehyde and melamine-formaldehyde resin powders. Such polymeric powders have particle sizes on the order of 10 to 40 microns. The fibrous binders include polymeric fibers such as such as the polyolefins, resulting from monomers having from two to about five carbon atoms, e.g., polyethylene and polypropylene and multi-component fibers of various geometries and polymer combinations. The length of such types of fiber is usually less than 0.5 inch. The preferred length is less than 0.25 inch. The preferred fiber diameter is less than 200 microns.

Additional thermoplastic polymers such as ethylene-vinyl acetate, polystyrene, polyvinyl chloride, polycarbonates, polysulfones, polyesters and nylons can be used as binders. The crystalline polymers usually give better physical strength and better defined melting temperatures. The amorphous polymers do not have melting temperatures; the best way to select the baking temperature is to experiment from 5 to 20° C. above the glass transition temperature. The melting temperatures and glass transition temperatures can be determined by using DSC or can be obtained from the suppliers.

In addition to the foregoing components, the porous structures of the present invention can also include optional components or additives such as cationic charged resins, ion-exchange materials, perlite, diatomaceous earth, activated alumina, zeolites, resin solutions, latexes, metallic materials and fibers, cellulose, carbon particles, carbon fibers, rayon fibers, nylon fibers, polypropylene fibers, polyester fibers, glass fibers, steel fibers and graphite fibers and the like, including mixtures thereof to provide additional properties and features or to reduce the cost of the product. Many fibers such as polypropylene, polyester, nylon, glass, carbon, steel and graphite are good candidates for improving tensile and impact strength. Amounts of such optional components range from about 0.1 to about 90 percent by weight, with an attendant decrease in the amount of primary media.

While several of the optional components may also serve as primary separation media or green strength agents, and thus be present in mixtures from which the porous structures are produced, as optional components they are employed where the separation media or green strength agents employed are not the same as for instance, where the separation media is diatomaceous earth and the optional component is carbon fiber or, the green strength agent is a polyolefin fiber and the optional component is a glass fiber.

Cationic charged resin can be sprayed directly onto the particulate media, such as diatomaceous earth and carbon. These treated media will adsorb small anionic particulates with greater efficiency in aqueous separation or filtration. Such resins have been discussed in earlier patents owned by the Assignee of record, the subject matter of which is incorporated by reference herein. They include for example, U.S. Pat Nos. 4,007,113 and 4,007,114 relating to melamine formaldehyde cationic colloid modified media; U.S. Pat. No. 4,305,782 relating to cationic colloidal silica modified fibrous and particulate elements and, U.S. Pat. No. 4,309,247 relating to epichlorohydrin-polyamine and polyamide cationic resin treated cellulosic fiber and particulate media.

The preferred process for practice of the invention is dry laying of the components, as opposed to wet laying or wet processing. In the dry laying process, the components are first dry blended, followed by delivering the mixture onto a suitable surface at ambient temperatures. The definition of "suitable surface" as used herein includes depositing into a mold as well as onto another surface that permits building or establishing a desired thickness of the dry mixture for subsequent processing. Where the mixture is deposited into a mold, the desired thickness is obtained essentially by filling the mold. As will be explained hereinbelow, the mixture can also be delivered to a flat surface, to a uniform and desired thickness. Accordingly, practice of the process of this invention is not to be limited by whether or not a mold is employed.

The definition of "dry" includes minimal amounts of liquid within the blend. This amount of liquid does not change the appearance and physical handling significantly to become a "wet" blend or process, which is defined to have dripping liquid or require different handling. Thus, the process of the present invention does not involve the formation of a wet slurry of the components; accordingly, vacuuming or other steps for the removal of liquid are not necessary.

The particle size distribution of the mixture can be kept very uniform by the presence of a fibrillated fiber component throughout the entire structure. In other words, fibrillated fibers hinder the separation or migration of the large and small particles. The blend at this stage has no green strength.

The next step in the process of the present invention, is densification of the dry laid mixture into different forms and shapes. Such methods include calendering, pressing, piston molding, injection molding, isostatic pressing, and extrusion. Where the mixture has been deposited into a mold, it is compressed and densified by piston molding, isostatic compression and the like. Similarly, where the mixture has been delivered to a flat surface, it can be compressed and densified by calendering or other pressing operations, forming a flat sheet which can be used where flat sheet media is desired or, disk-shaped members can be cut from such sheets for ultimate use in appropriately configured porous structures.

Isostatic compression includes either wet-bag or dry-bag processing. As is known, both methods employ a chamber filled with fluid which is applied under hydraulic pressure simultaneously and uniformly to all surfaces of the part being formed. The powdered material to be compacted is encapsulated in a shaped membrane, known as "bag tooling", which serves both as a mold for the part and as barrier against the hydraulic liquid. The uniform pressure compacts the powder from all directions into the exact shape of the bag tooling.

In the wet-bag method, powder is loaded into a rubber mold. After loading, the mold is then sealed and hydraulic pressure is applied. Once pressurizing is complete, the mold must be reopened and the compressed part removed.

In the dry-bag tooling method, the hydraulic pressurizing fluid is sealed by a master dry-bag inside of the pressure chamber and it is within this master bag, that a separate tooling dry-bag is inserted. With this method, the material is loaded into the tool bag, and then after pressurizing, the tool bag call be removed from the pressure chamber. The dry-bag method simplifies operations and increases the speed of production. Dry-bag compression is a preferred, albeit non-limiting means to provide the step of densifying.

With reference to FIG. 1A, the dry laid mixture of porous structure forming components 20 is fed into a rubber mold, bag 21, held within a pressure vessel 22. The vessel 22 provides a hydraulically activated chamber 23 to compress the mold 21. In FIG. 1B, the vessel is closed by a cover 24, via suitable means (not shown) and the rubber mold 21 is then compressed within the chamber 23 (FIG. 1C). Following compression the green product 25, has sufficient green strength to be self-supporting without an external mold and as depicted in FIG. 1D, the pressure on bag 21 is released, the vessel 22 is opened and the product 25 is removed via suitable means, such as ram 26. Filling the rubber mold is accomplished with the aid of a hopper or similar filler apparatus, depicted generally by the numeral 28. Such apparatus must be capable of evenly distributing the mixture of components 20 within the mold quickly and in measured amounts. Being within the ordinary skill of the art, such apparatus need not be described more fully. Of course, the foregoing explanation as well as FIGS. 1A–1D are merely schematic and have been simplified for presentation of one type of operation.

As noted hereinabove, the dry laid mixture of porous structure forming components 20 can also be fed onto a flat surface. Alternatively and with reference to FIG. 2A, such a flat surface 30, can comprise a movable belt, suitably supported and passing through a calender apparatus, generally 31. Tile mixture is first deposited to provide a desired thickness, as depicted to the left of the calender in FIG. 2A; it is then conveyed between opposed calender rolls 32 and 33 to form a densified sheet of green product 34. At this stage, the sheet 34 is removed from the first surface 30 and transferred to a press 35, providing a lower support platen 36 and an upper die platen 38, as schematically depicted in FIG. 2B. The latter provides a plurality of dies 39 which stamp or cut a like plurality of smaller green porous media products, such as disks, or other suitably configured media. The green disks 34 are then conveyed to an oven 40 for further processing into the porous media.

Although a continuous process has been schematically depicted in FIGS. 2A and 2B, it is to be appreciated that the surface 30 could as well be the lower platen of a press. The calender 31 would be replaced by an upper platen (not shown) that would compress and densify the mixture of components 20 into the sheet of green product 34. Of course, subsequent cutting of the green product is dictated by the ultimate shape and dimensions of the porous media desired and thus, the sheet itself may be configured for use in plate and frame apparatus or the like without being subjected to the cutting operation depicted in FIG. 2B.

After, formation of the green product 25 or 34, the next step is to bind the primary media by melting the binder within the porous structure to a temperature just above the melting point of the polymeric binder so that a self-support condition is maintained. This is again schematically depicted in FIG. 2C for the green disk products 34. The includes a process wherein the product is finished after the compressing step and does not require baking or separate heating. Examples of such products produced by compression alone are presented herein below in Example Nos. 1 to 20.

In Table I which follows, the differences between the processes taught by the three patents summarized in the Background and the process of the present invention which has been assigned to Cuno, Inc., have been listed. None of the first three products of the prior art were self-supporting prior to and during thermal bonding.

TABLE I

PROCESS COMPARISONS

| COMPANY & PATENT NO. | CARBON PARTICLE SIZE, μ | BINDER AND MELT INDEX | MIXING TEMP. | MOLDING PRESSURE, PSI TEMP. & TIME | GREEN/HOT STRENGTH | HEATING TEMP. °C. | SHEAR FORCE HOT BINDER |
|---|---|---|---|---|---|---|---|
| Pall Corp 4,664,683 | 200–2000 | Low Density Poly-ethylene Med. to High | Ambient | 0.3–40 psi. Hot 1–2 min | No/No | 115–135° C. (28–50° C. above Vicat softening point) | Low shear |
| Amway Corp 4,859,386 | 30–840 | Ultra-High Mol. Weight Polyethylene Very Low | Ambient | 30–120 psi Hot No description of time | No/No | 175–205° C. (100–130° C. above Vicat softening point) | Low shear |
| KT Corp. 5,019,311 | 0.1–3000 | Poly-ethylene Vinyl Acetate Copolymer Med. to High | Hot | 50–4000 psi Hot Continuous | No/No | 145° C. for EVA (70° C. above Vicat softening point) | High shear |
| Cuno, Inc. | 10–400 | High Density Polyethylene Med. to High | Ambient | 200–4000 psi Ambient ~30–50 min | Self supporting/ Self Supporting | 135–145° C. (8–20° C. above Vicat softening point) | No shear | preferred temperature is up to 20° C. above the melting point of the binder and most preferred is up to 10° C. above the melting point. For example, the bonding temperature and time for the FA700 (Quantum USI) and 13040F (MiniFiber) high density polyethylene binders is about 140° C. (~5° C. above melting temperature, and ~15° above Vicat softening temperature) at 40 minutes, respectively. (The melting point of the binder is determined by a differential scanning calorimeter at 5° C./min.) At this heating temperature, the porous structure gives the highest physical strength without causing a high melt flow problem, which is believed to reduce the capacity and efficiency by sealing off the pores of the primary adsorptive separation media, such as activated carbon.

In addition to the above features, the porous structures are self-supporting during the heating process. The green strength agents also provide hot strength to the porous structures. The best combinations of time and temperature are dependent on the type or mixtures of binders. The best condition is to give the least melt flow and highest physical strength within the shortest amount of time. Other thermal bonding processes such as microwave, radio frequency and infrared heating can be used. Unlike the existing art, there is no shear force applied against the media during the baking step. Nor, are ultra-high molecular weight polymer binders employed.

While heating the green product 25 sufficient to melt or react the binder is a preferred step, the present invention also Multiple layers of separation media can be made with the calendering, pressing or isostatic compression processes. The blends of each layer can be added and pressed sequentially to make the multi-layer porous structures at various pressing conditions. In the case of the isostatic process, the blends of different layers can be added simultaneously through a feeder equipped with a concentric mouth. The feeder moves upward during filling without disturbing the separate layers. Or, the filling process can be accomplished by removing the sleeves after the different components are added.

The addition of as little as about 1% of high strength fibrous materials can significantly improve the physical and impact strength. This type of composite structure reduces cracking of products during shipping and handling, and improves reliability of the product. Many fibers such as, polypropylene, polyester, glass, carbon and graphite fibers are good candidates for such purpose. If the media becomes too fluffy and difficult to process when large amounts of the fibrous materials are used in the product, it is preferred to precompact the media. The shape of the pre-compacted materials can be pressed into many shapes such as sheet, rod, tube, pellet, and briquette.

Another advantage of the isostatic compression process is to make various shapes or patterns of the porous structures. In particular, grooves in different shapes can be directly molded onto the surface of the porous structures when the bag tooling is designed to have opposite patterns. The surface grooves improve the dirt holding capacity in separation applications. Furthermore, this process can make porous structures, typically in cylindrical shape, with a hollow center core which can be sealed at one end when a shorter center pin is used. This kind of product eliminates the materials and process needed to put an end cap at the end of the structure in a typical cylindrical filter construction process.

Densifying via isostatic compression provides as another benefit the formation of porous structures having L/D (length to diameter) ratios greater than 3:1, in contrast to conventional means of axial compression that are as a practical matter limited to L/D of 2 to 3:1, because of axial density gradients created within the structure.

Summarizing, the major ingredients within the formulations of the porous structures are: 1) primary media (PM); 2) green strength agent (GSA); 3) binder (B) and, 4) optional additives. The optional additives normally do not change the main functions of PM, GSA, and B. However, the additive can become part of the PM, GSA, and/or B when the contribution of the additive is significant.

Before proceeding with the examples to demonstrate practice of the present invention, it is necessary to recapitulate on the foregoing components. Accordingly, in some instances there are minimally three separate components present, excluding optional components. These include the primary media PM, the green strength agent GSA and the binder B, as depicted in boxes 50 of FIGS. 3A and 3B. These components are initially mixed dry, and then compressed, box 51 removed from the box 52 and either heated, FIG. 3A box 53 or not heated, as depicted in FIG. 3B. Both processes produce non-adsorptive and adsorptive porous structures e.g., filter, or separation media, boxes 54 and 55 respectively of FIG. 3A and boxes 56 and 58 respectively of FIG. 3B.

Figure 3B:
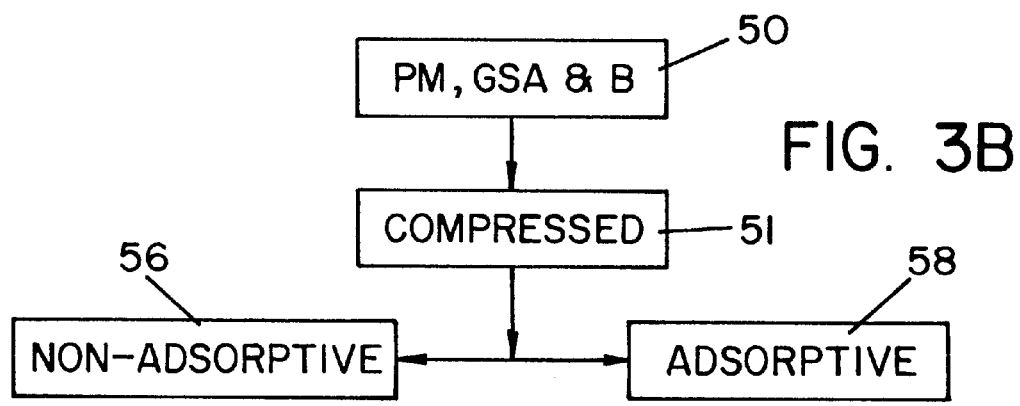

Focusing on the method outlined per FIG. 3A and with reference to FIG. 4, the primary media in box 60 can include both powders 61 and fibers 62. The binder materials in box 63 can also include both powders 64 and fibers 65. Finally, the green strength agents in box 66 can also include powders 67 and fibers 68. In the interest of simplifying the explanation at this stage, species of components that are non-powder and non-fiber, such as resin solutions, latexes and water, have not been depicted in FIG. 4 with the understanding that their presence is not necessarily precluded. The point to be considered in FIG. 4 is that the finished product 69 can result from the combination of powders and fibers, for example: PM powder, 61; B powder, 64 and GSA fibers, 68 as well as mixtures of three fibers: PM, 62; B, 65 and GSA, 68 and so forth.

It must also be considered that PM powders and fibers are generally non-melting, but can be selected from meltable materials. Likewise, while the B powders and fibers are meltable, the GSA powders and fibers are generally nonmelting, but can be selected from meltable materials. Furthermore, it is not always necessary to select three separate component materials to provide a PM, a B and a GSA. For instance, fiber selected for the PM can be employed as the GSA for a two-component product 69; or where the fiber selected for the PM is a multi-component fiber (HDPE/PP), it can be employed as the B and GSA, for a one component product 69 and so forth. In similar fashion, the present invention can be practiced with mixtures of more than one PM and/or more than one B and/or more than one GSA and thus, it is to be appreciated that the porous structures 69 and processes of the present invention are not limited to the combination of a single PM component, a single B component and a single GSA component.

Nevertheless, the porous structures of the present invention will comprise between 70 and 90 percent by weight of PM; between eight and 20 percent by weight of B; and between one and 15 percent by weight of GSA even if two or three of the components are originally provided in the mixture by one component. Where either B or GSA is a resin solution or the like, not depicted in FIG. 4, it is still possible to select powders and/or fibers for the PM and for at least one other component, B or GSA.

With reference next to FIGS. 5–7, further explanation of the invention is schematically depicted for three exemplary component mixtures. In FIG. 5A, the mixture of PM, indicated by 80; B, indicated by 81; and GSA, indicated by 82 is first depicted. In FIG. 5B, after the mixture has been compressed and heated, it will be noted that the product 83, only a segment of which is shown, comprises identifiable PM 80 and GSA 82, while the binder material 81 has melted and is holding the other two components together, to form the product 83. A typical example (Example 41) includes carbon particles as the PM; fibrillated polypropylene fiber as the GSA and polyethylene powder as the B. After thermal bonding, the polypropylene fiber acts to increase structural strength of the porous product 83.

In FIG. 6A, the mixture comprises PM; indicated by 90 and a second component 91, which represents a fibrous component, serving as the GSA and B. In FIG. 6B, after this mixture has been compressed and heated, it will be noted that a portion of the fiber 91 has melted, forming the binder 92 to bind the remaining fibers (GSA) and PM together in the product 93. A typical example includes carbon black as the PM and a fibrillated fiber e.g., PE, as the GSA and B (examples 17 to 20). FIG. 6C shows complete melting of the fiber 91, so that the primary media 90 and binder 92 remain. Depending upon the components selected, the product 93 can be that depicted by either FIG. 6B or FIG. 6C.

In FIG. 7A, the mixture comprises only a fiber, such as the multi-component HDPE/PP fibers, indicated by the numeral 91. These fibers provide PM, GSA and B (Example 47). In FIG. 7B, after these fibers have been compressed and heated, a portion of the fibers have melted, forming the binder 92 of product 94, while the majority of the fibers are now PM 95, forming the fiber matrix network of the product 94. A typical example is a product resulting from the compression and heating of multi-component fibers, such as HDPE/PP. Such fibers are depicted in FIGS. 8 and 9 wherein the inner core 96 is PP and the outer sheath 98 is HDPE. In FIG. 9 after these fibers 91 have been heated, portions of the sheaths 98 melt together to form a matrix of joined fibers which provide both separating capability and green strength.

With reference now to FIGS. 10–13, several of the types of products that can be manufactured according to the present invention are depicted. In FIG. 10, the product 100 comprises a cylindrical element or body 101 with a hollow central core 102. A plurality of annular grooves 103 are formed in the outermost surface 104 to increase the effective surface area of the element. Preferably, the grooves provided opposed tapered lands 105, as depicted in FIGS. 10 and 11, which strengthen the respective grooves and ensure the clean separation of the mold 21 from the element 101.

While such annular grooves 103 can be machined into a cylindrical cartridge blank, this extra step and the attendant waste material are eliminated by compressing the components in a mold, as described hereinabove. As another advantage, it is equally possible to provide other exterior surfaces than circumferential grooves. As an example, FIG. 12 depicts another product 110, providing a cylindrical body 111, with a hollow central core 112. The outermost surface 113 carries a plurality of longitudinal grooves 114, running axially over most of the length of the body. Typically, the grooves terminate at each end 115, of the cartridge.

As another example of exterior configuration, FIG. 13 depicts a product 120 having a cylindrical body 121, a central hollow core 122 and provided with a plurality of inwardly truncated dimples 123, from the outer circumferential surface 124. Of course, it is to be appreciated that other exterior configurations are readily possible as well as the fact that the overall configuration of the product is not limited to cylindrical, but could also be rectangular, square, or otherwise configured to accommodate the inner volume of a specific housing. Accordingly, it is to be appreciated that the present invention includes products having discontinuous exterior surfaces, provided without separate machining subsequent to manufacture, as well as smooth exterior surfaces i.e., uninterrupted cylindrical or other surfaces provided by a relatively smooth mold surface.

Figure 14:
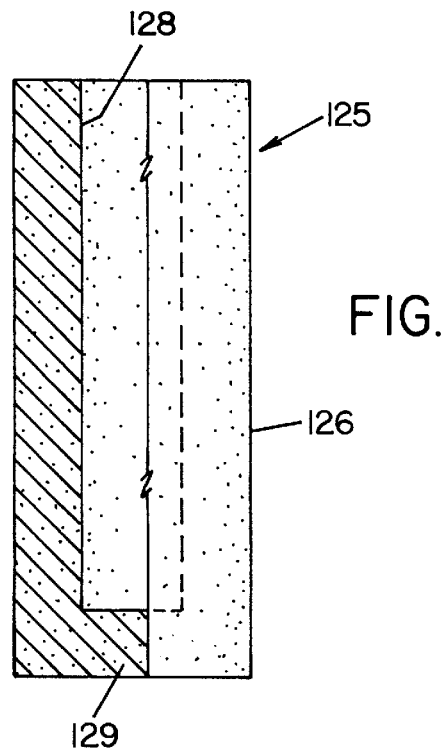
FIG. 14 is a side elevation, partially in section, depicting another porous structure according to the present invention, having one closed end.

It is also possible to formulate tubular products, having a hollow core, which are closed at one end, by densified the mixture of components in a closed end mold. Such a structure is depicted in FIG. 14 for the porous product 125, having a cylindrical body 126, a core 128 and a closed base 129. Typically, hollow tube products of this type, prepared from primary reinforcement media and a binder are hollow cylinders, open at both ends. By use of the process of the present invention, such limitations are no longer existent.

Figure 15:
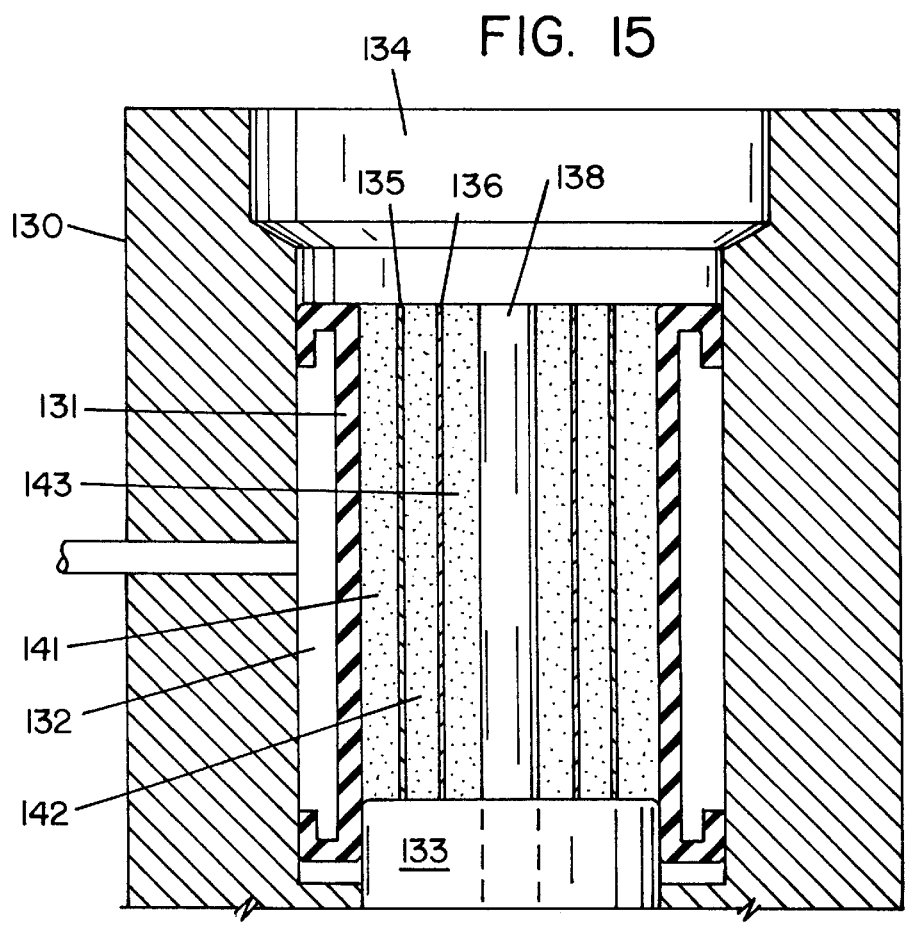
FIG. 15 is a side elevation, partially in section, depicting a mold in conjunction with a plurality of removable sleeves for the manufacture of multi-layered cylindrical porous structures.

It is also possible to prepare multi-layered cylindrical porous structures according to the present invention. With reference to FIG. 15, a pressure vessel 130 is depicted, provided with a rubber mold, bag 131, located within a hydraulically activated chamber 132. The chamber 132 is closed at the base by a ram 133 and at the top by a removable cover (not shown) received within mold opening 134. Located within the rubber mold are a plurality of cylindrical sleeves e.g., two 135 and 136, as well as a cylindrical central mandrel 138 which forms a hollow core 139, for the porous structure 140 (FIG. 16).

While use of a mandrel is not critical to manufacture of the porous structures because the process of the present invention is suitable for the manufacture of solid porous structures, a mandrel will be used for making hollow structures which are, in turn, employed where radial flow through the porous structure is desired or necessary.

As is evident from FIG. 15, the sleeves 135 and 136 are concentric with the mandrel 138 and together allow for the addition of three different combinations of components 141, 142 and 143. The sleeves are initially placed within the rubber mold 131 so that three cylindrical shells of components can be formed after which the sleeves are withdrawn, the mold is closed and the components are densified under pressure. The mold is subsequently opened and the green product 140 is removed via the ram 133 for subsequent heating to melt the binder materials.

Figure 16:
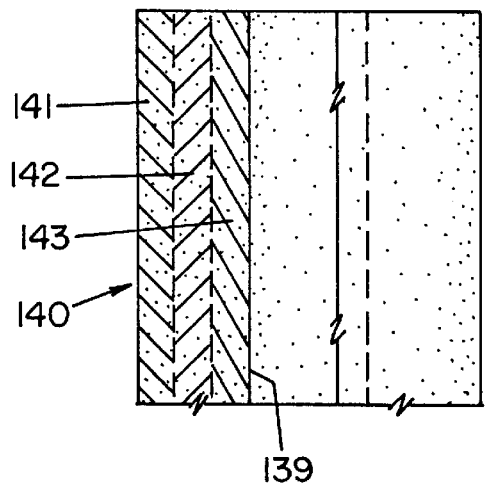
FIG. 16 is a side elevation, partially in section, depicting a portion of a multi-layered cylindrical porous structure product, according to the present invention.

With reference to FIG. 16, a portion of the resulting product 140 is depicted having an outer layer 141 of one type of media; an intermediate layer 142 of another type of media and, an inner layer 143 of a media different from the intermediate layer 142, which can be the same media as the outer layer 141, or different. The advantages should be apparent considering the fact that the resulting product 140 can provide varying or gradient porosities, from coarse to fine or from fine to coarse. Additionally, different types of primary media can be employed, such as particulate and fiber, as is true for the other two components, the binder material and the green strength agent. Moreover, while the foregoing description relates to three distinguishable layers, it is to be appreciated that multi-layered products providing two layers or more than three layers are possible according to the present invention.

Figure 17A:
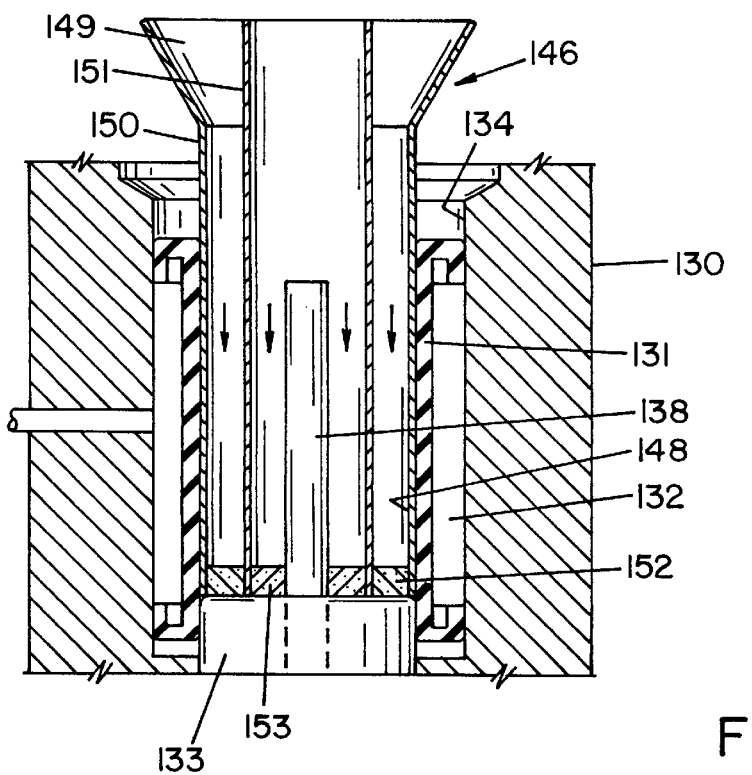
FIG. 17A is a side elevation, partially in section, depicting a mold in conjunction with apparatus, schematically depicted for the manufacture of multi-layered cylindrical porous structures.
Figure 17B:
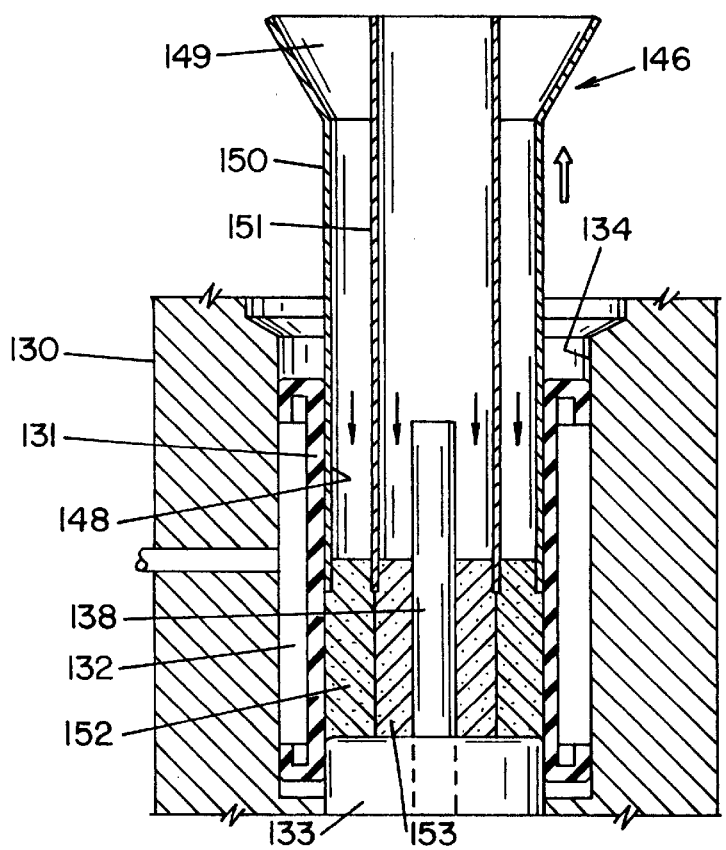
FIG. 17B is a side elevation, partially in section, depicting a mold as in FIG. 17A, partially filled.
Figure 17C:
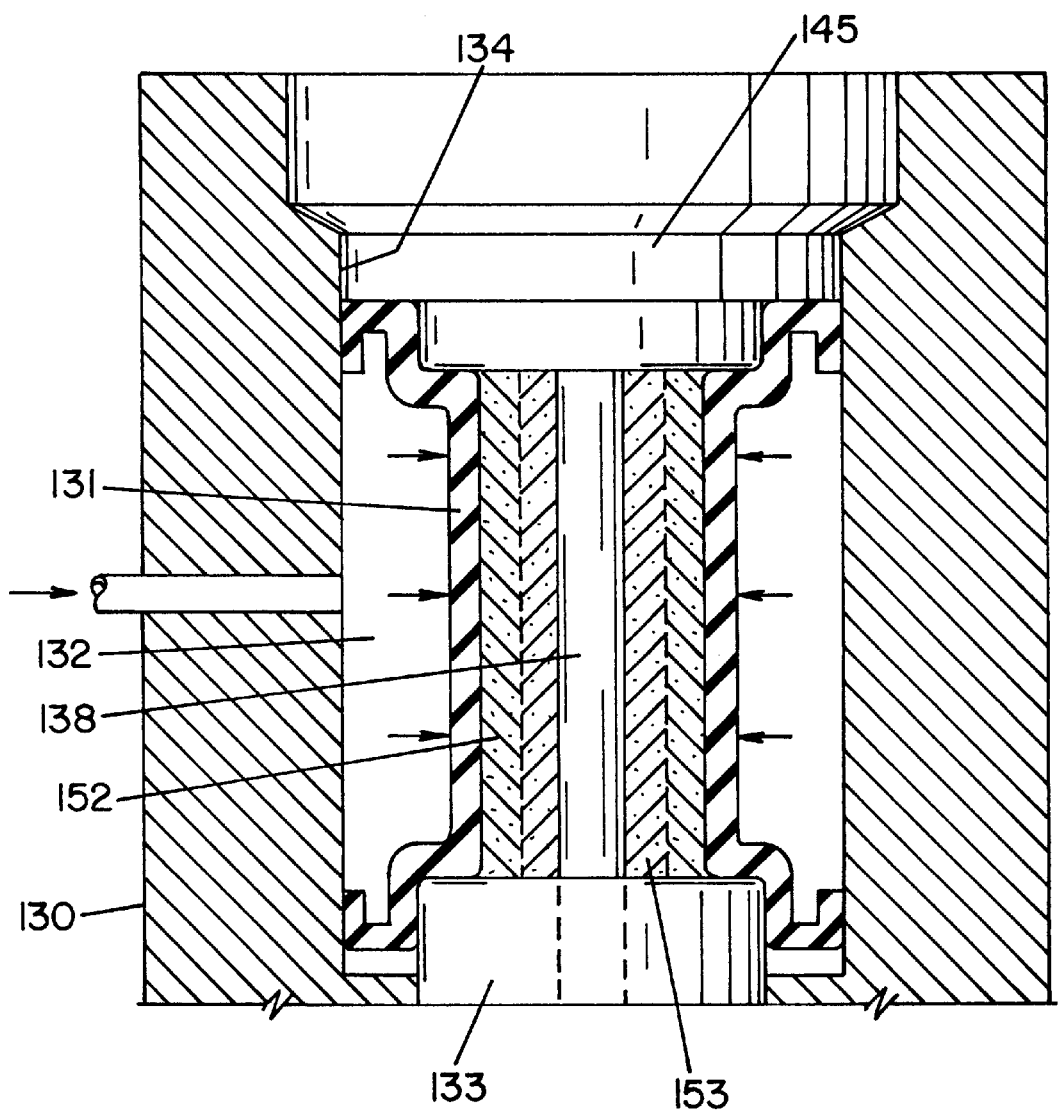
FIG. 17C is a side elevation, partially in section, depicting a mold as in FIGS. 17A–B, depicting a densified multi-layered cylindrical porous structure.

As an alternative, it is also possible to prepare multi-layered cylindrical porous structures without the use of sleeves. With reference to FIG. 17A, a pressure vessel 130 is again depicted, provided with a rubber mold, bag 131, located within a hydraulically activated chamber 132. The chamber 132 is closed at the base by a ram 133 and at the top by a removable cover 145 (FIG. 17C) received within mold opening 135. When the mold is open, a filling apparatus, filler 146, is inserted which dispenses concentric layers of composite media as described throughout herein.

Filler 146, as depicted provides an open base 148 and an upper funnel-like mouth 149. The filler 146 is supplied with a source of composite mixtures according to the present invention, in this instance two. It is to be understood that filler 146 has been depicted somewhat schematically in the interest of simplification and that means for delivering composite mixtures to the mouth and through the filler are within the skill of the art and need not be depicted. The filler 146 also provides an outer wall 150 and an internal sleeve 151, to provide two separate concentric layers, 152 and 153, of composite mixtures. Of course, while only two layers are shown, it is to be understood that more layers are possible.

Filler 146 is initially placed within the bottom of the mold, as depicted in FIG. 17A, and the mixtures are carefully deposited into the mold so that the layers 152, 153 remain separate and distinct. As it slowly withdrawn, (FIG. 17B) the composites continue to flow into the mold and form, in essence, a layered pre-product, prior to densification. When the filler 146 has completed its deposition, the flow is shut off (by suitable means, not shown), it is removed and the cover 145 is placed, following which the mixtures are subjected to isostatic compressing. After pressing, the product 155 appears as in FIG. 17C and is withdrawn from the mold 130, similar to the procedure described hereinabove. Again, while a mandrel 138 has been depicted for a hollow structure, solid, layered structures can be manufactured by omitting the mandrel.

It is to be appreciated that one could also form multi-layered products with two or more zones or layers of different character by sequentially compressing an added layer over a previously made structure of cylindrical shape or other. While this embodiment has not been depicted in the drawings, based upon the foregoing description herein, it is within the skill of the art to form a porous structure in this manner and accordingly, is an alternative included within the scope of this invention. Sequential compressing can be practiced by adding an additional layer or layers of composite materials to the compressed structure 155, before it has been removed from the mold or, after such removal in which instance the structure could be placed in other apparatus or returned to the mold.

Additionally, flat sheet or layer materials can also be formed, particularly where the mixture of components is calendered or otherwise densified to provide such shapes. Moreover, it is possible to formulate bi- and multi-layered flat sheet products by adding subsequent layers of component mixtures onto the first layer. In this manner, it is possible to formulate products from different mixtures of the basic components, each layer having a specific blend of one or more of the component elements as provide primary separation, reinforcement and binding capabilities. The specific blend can be the same as another layer in the product or different. Also, such layers can have smooth exterior e.g., upper and lower, surfaces or, they can be provided with grooves or other configurations, as described hereinabove.

Figure 18:
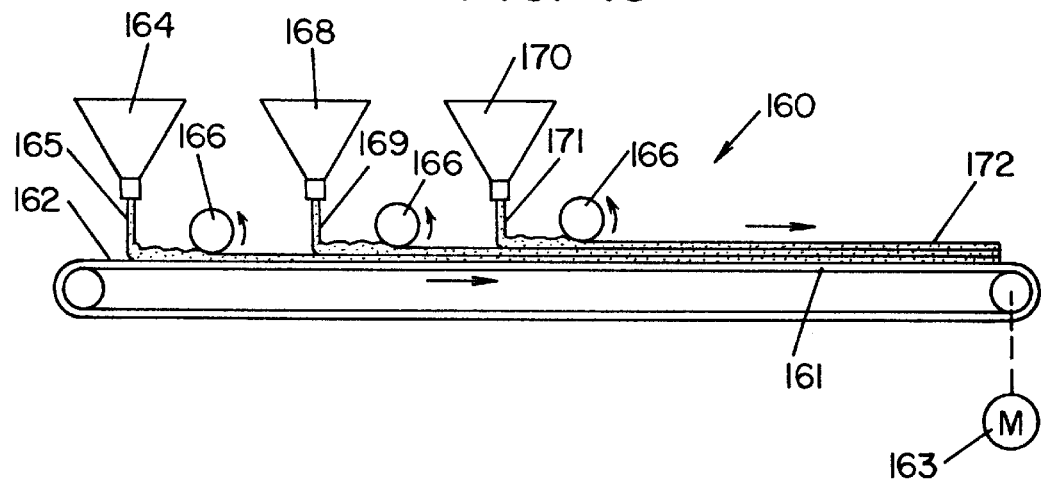
FIG. 18 is a schematic depiction of apparatus for manufacturing multi-layered flat sheet porous structures, according to the present invention.

With reference to FIG. 18, an apparatus 160 is depicted schematically which comprises a movable belt 161, providing a flat surface 162, the belt being driven by a motor 163. Above the surface 162, is a first hopper 164 which dispenses a first type of media 165, which is uniformly laid out by a doctor blade or roller 166. A second hopper 168 is provided downstream from the first, to dispenses an intermediate layer of media 169, which is again uniformly laid out by a roller 166. Further downstream, is third hopper 170 which dispenses a third type of media 171, which is also uniformly laid out by a roller 166. As a result, a product is formed which can be densified on the belt by means not shown to form the green product 172, or subsequently densified.

Figure 19:
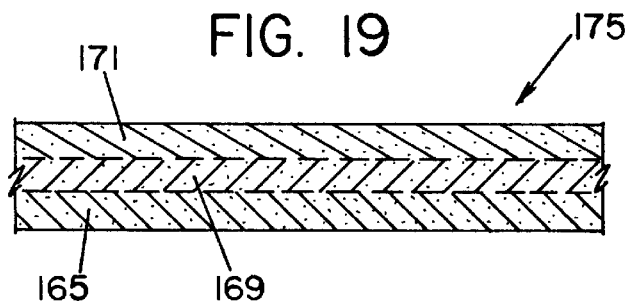
FIG. 19 is a cross-section through a portion of a multi-layered flat sheet porous structure product, according to the present invention.

In FIG. 19, a portion of the multi-layered flat product 175 is depicted in cross-section, providing a first layer 165 of one type of media; an intermediate layer 169 of another type of media and, an third layer 171 of a media different from the intermediate layer 169, which can be the same media as the first layer 165, or different. As for the cylindrical layered product 140, the resulting product 175 can provide varying or gradient porosities, from coarse to fine or from fine to coarse. Additionally, different types of primary media, binder material and/or green strength agent can be employed. Again, while the foregoing description relates to three distinguishable layers, it is to be appreciated that multi-layered products providing two layers or more than three layers are possible according to the present invention. Similar to the explanation provided with respect to FIGS. 2B and 2C, the green flat sheet product 172 can be die cut into a plurality of disks or other configured media.

It is again to be appreciated that one could also form multi-layered products with two or more zones or layers of different character by sequentially compressing an added layer over a previously made flat structure. To do so would merely require the step of feeding a subsequent layer of another media composite, prior to heating, followed by densification of all the layers. Additional layers could be added in this fashion or, several layers of media could be added and densified in one step, depending upon the design of the apparatus being employed.

Figure 20:
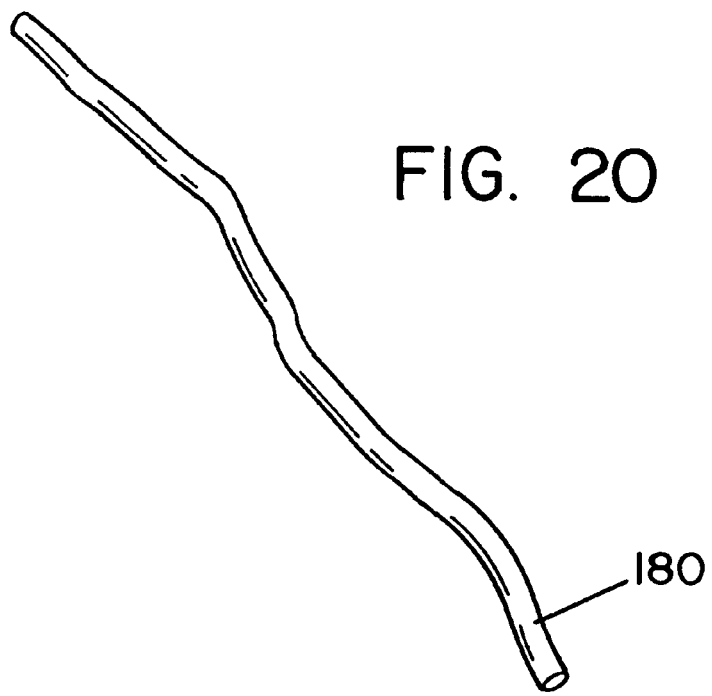
FIG. 20 is a perspective view of a non-fibrillated fiber component that can be employed as a component of the porous structures of the present invention.
Figure 21:
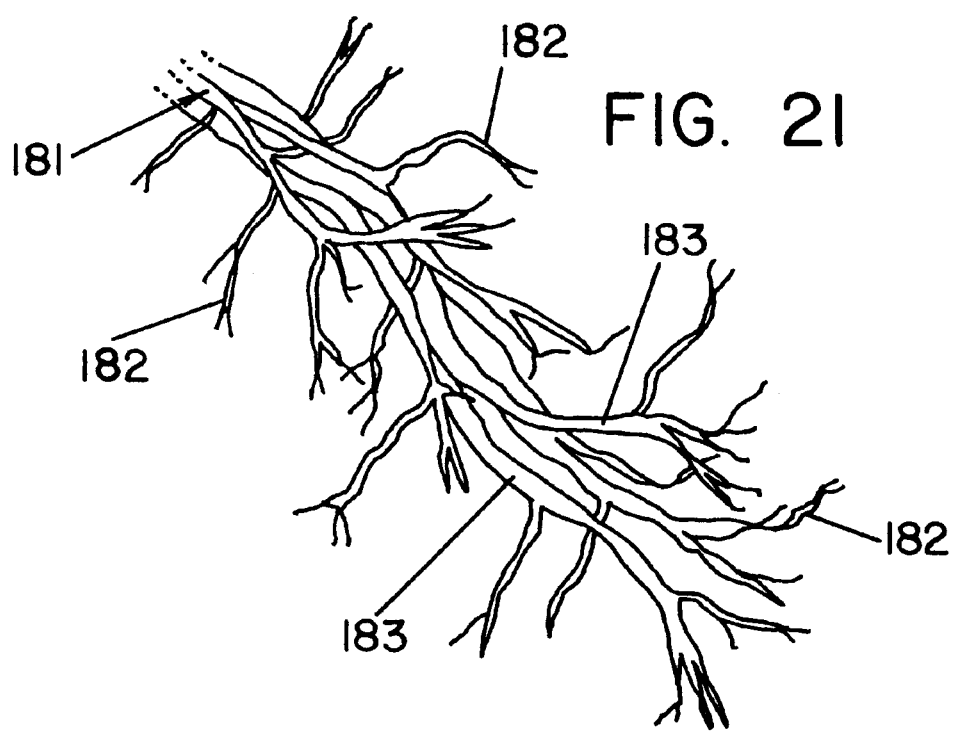

From the foregoing explanation of fibrous components, it is to be appreciated that the fibers can be monofilamentary, as is depicted by the fiber 180 in FIG. 20, or they can be fibrillated, as depicted by the fiber 181 in FIG. 21. Fibrillated fibers 181 provide fibrils 182 extending outwardly from strands 183. Fibrillated fibers are useful as the PM, as the GSA and as the binder B, where some melting occurs.

According to the preferred process of the present invention, a variety of porous structures can be manufactured under several different pressing and heating conditions based on whether the primary media is non-adsorptive or adsorptive (or absorptive). The various combinations for manufacture are depicted diagrammatically in FIGS. 3A and 3B. There are nine (9) major cases for making the non-adsorptive and four (4) major cases for making the adsorptive porous structures presented in Table II when different PM, GSA, and B material combinations are compressed and heated.

TABLE II

CASES FOR COMPRESSING AND HEATING OF COMPONENTS

| CASE | PM | GSA | B | ADSORPTIVE MEDIA | NON-ADSORPTIVE MEDIA |
|------|----|----|---|------------------|----------------------|
| A1 | O | O | M | Yes | Yes |
| A2 | O | M | M | Yes | Yes |
| A3 | M | O | M | — | Yes |
| A4 | M | M | M | — | Yes |
| A5 | O | — | M | Yes | Yes |
| A6 | O | M | — | Yes | Yes |
| A7 | M | M | — | — | Yes |
| A8 | M | O | — | — | Yes |
| A9 | M | — | — | — | Yes |

The O symbol indicates the presence of the ingredient and it does not function as a binder. The M symbol indicates the presence of the ingredient and it melts or reacts as a binder.

Case A1: The primary media and green strength agent do not melt or react. Only the binder melts or reacts. (Example 41).

Case A2: The primary media does not melt or reacts. Both of the green strength agent and binder melt or react. (Examples 21–23).

Case A3: The green strength agent does not melt. Primary media and binder both melt or react. (Example 42).

Case A4: Primary media, green strength agent, and binder all melt. (Example 43).

Case A5: Either primary or binder works as green strength agent. Only the binder melts or reacts. (Example 44).

Case A6: The green strength agent melts or reacts. No binder needed. (Examples 17–20, if the PE is melted).

Case A7: Both the primary media and green strength agent melt or react. (Example 45).

Case A8: The primary media melts or reacts. No binder is necessary. (Example 46).

Case A9: The primary media functions as green strength agent and binder. (Example 47).

Another example, the multi-component polyethylene sheath/polypropylene core fiber can be used as a primary media, however, if the polyethylene sheath melts by heating, then it works as a binder. If there is not binder present, either PM and/or GSA must melt or react (Case A6, A7, A8, and A9). Formulations with more than one kind of PM, GSA, and B are covered by the combinations of the nine basic cases shown in the Table II. In the case of adsorptive porous structures, the primary media does not melt or react with other ingredients, therefore, only four (4) different cases can be found for different combinations (Table II).

The adsorptive porous structures, i.e., activated carbon media, should be made with minimum amounts of binder to reduce blinding the useful surfaces. However, non-adsorptive media does not have these restrictions. Normally, it is preferred to have higher physical strength at high flow rates. The amount of binders for non-adsorptive media can be significantly higher than the amount used for the adsorptive media, if higher physical strength is required.

If the media does not require binding force by melting or reacting the binder, the green strength agent is then required to hold the porous structure together to give the final strength. The primary media (PM) and/or the green strength agent (GSA) should be responsible for contributing the strength. The porous structure is held together by the entangled or deformed fibers and particles. For each of the non-adsorptive and adsorptive media there are two (2) cases listed in Table III. Typical fine metal fibers and particles are ideal candidates to provide the physical strength.

TABLE III

CASES FOR NO-BINDER FORMULATION

| CASE | PM | GSA | ADSORPTIVE MEDIA | NON-ADSORPTIVE MEDIA |
|---|---|---|---|---|
| B1 | O | O | Yes | Yes |
| B2 | O | — | Yes | Yes |

The O symbol indicates the presence of the ingredient and it does not function as a binder.

In order to demonstrate practice of the present invention, a series of filter blocks were prepared as detailed in the examples hereinbelow. All parts are presented by weight percent, unless otherwise noted.

Examples No. 1–20

The contribution of fibrillated fiber, namely polyethylene (PE), on green strength of the carbon block was demonstrated by formulating carbon, PE fiber and PE powder utilizing the following ingredients:

85% Carbon: Barnebey & Sutcliffe Type 3049 carbon, 80×325 mesh
4–15% PE fiber: (Minifiber, 13040F)
5–11% PE powder: (Quantum Chemical, FASP007)

Figure 22:
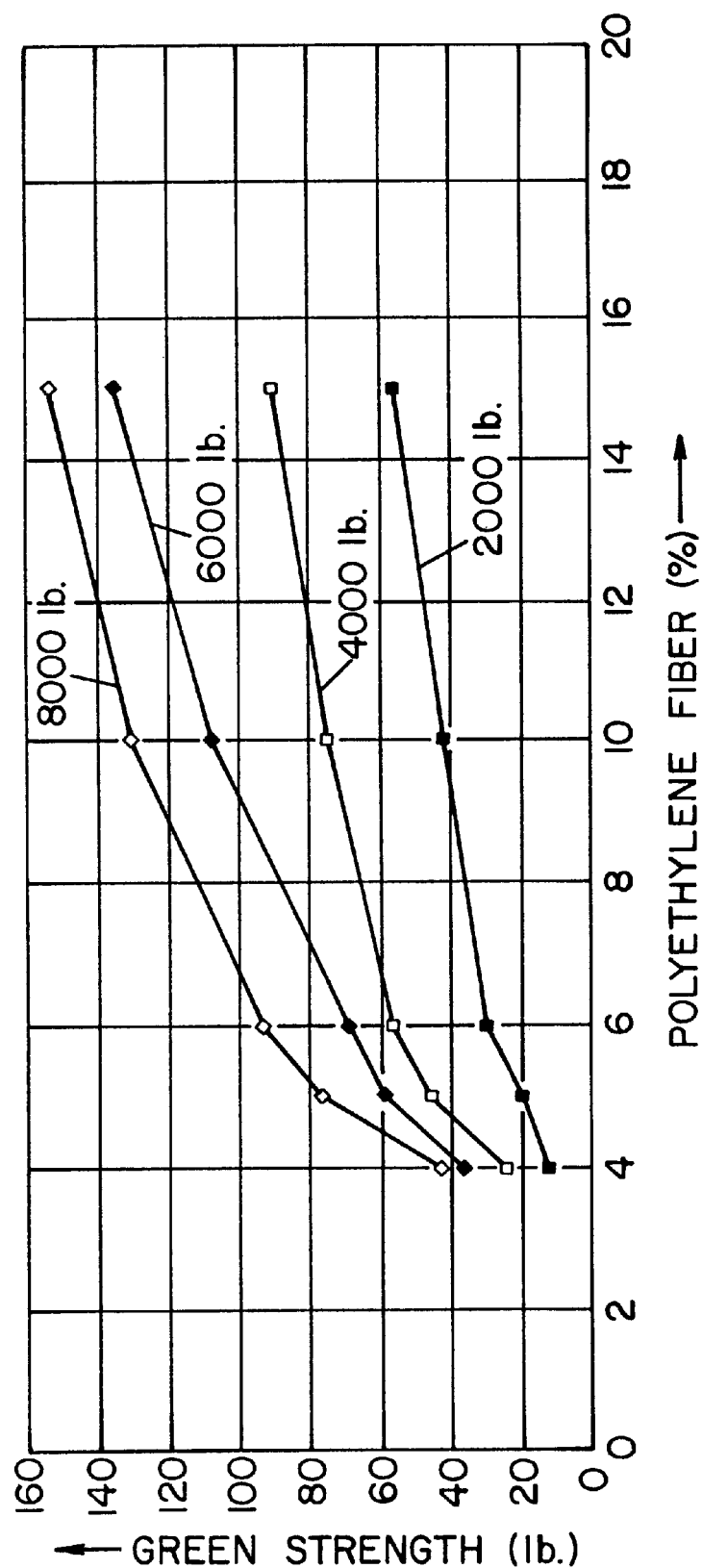
FIG. 22 is a perspective view of a fibrillated fiber component that can be employed as a component of the porous structures of the present invention.

As will be seen, the relative amounts of powder and fiber, totalling 15 percent of polyethylene (PE) by weight, were varied among Examples 1 to 20. All of the blocks formed were 55 grams and each was molded into blocks with a metal piston mold under various pressures. The mold employed was 1.75 inch O.D. and 0.375 inch I.D. and dwell time was 15 seconds. The length varied slightly by about 2 to 5 percent, depending upon the molding pressure and was about 2.4 inches. The green strength was measured by compressing the porous structures perpendicular to the block axis at a rate of 0.0238 inches/sec. The effects of molding pressure and the amount of PE fiber on the green strength have been provided in Table IV and FIG. 22. The four curves of FIG. 22 are plots of the data points presented in Table IV, each curve beginning at 4 percent PE fiber and increasing to 15 percent. Respective green strengths can be read from the curves and compared.

TABLE IV

EFFECT OF MOLDING PRESSURE AND PE FIBER CONTENT ON GREEN STRENGTH

| EXAMPLE NO. | % OF PE FIBER | % OF PE POWDER | MOLDING FORCE, LB | GREEN STRENGTH, LB |
|---|---|---|---|---|
| 1 | 4 | 11 | 2000 | 11.85 |
| 2 | 4 | 11 | 4000 | 24.10 |
| 3 | 4 | 11 | 6000 | 36.30 |
| 4 | 4 | 11 | 8000 | 42.30 |
| 5 | 5 | 10 | 2000 | 19.25 |
| 6 | 5 | 10 | 4000 | 42.25 |
| 7 | 5 | 10 | 6000 | 57.90 |
| 8 | 5 | 10 | 8000 | 76.50 |
| 9 | 6 | 9 | 2000 | 29.55 |
| 10 | 6 | 9 | 4000 | 56.44 |
| 11 | 6 | 9 | 6000 | 68.85 |
| 12 | 6 | 9 | 8000 | 93.50 |
| 13 | 10 | 5 | 2000 | 41.65 |
| 14 | 10 | 5 | 4000 | 74.70 |

TABLE IV-continued

EFFECT OF MOLDING PRESSURE AND PE FIBER CONTENT ON GREEN STRENGTH

| EXAMPLE NO. | % OF PE FIBER | % OF PE POWDER | MOLDING FORCE, LB | GREEN STRENGTH, LB |
|---|---|---|---|---|
| 15 | 10 | 5 | 6000 | 107.90 |
| 16 | 10 | 5 | 8000 | 131.05 |
| 17 | 15 | 0 | 2000 | 55.70 |
| 18 | 15 | 0 | 4000 | 90.80 |
| 19 | 15 | 0 | 6000 | 135.90 |
| 20 | 15 | 0 | 8000 | 153.95 |

As should be apparent from Table IV, the higher molding pressures provided greater green strength and, the green strengths were higher when the PE fiber was increased, for blocks comprising 85 percent carbon. For purposes of subsequent processing, acceptable green strength for these blocks is about 20 pounds.

Examples No. 21–24

Three porous structures (carbon blocks) were manufactured utilizing the following ingredients:

4% PE fiber 13040F
11% PE powder FASP007
85% Carbon: Barnebey & Sutcliffe Type 3049 carbon, 80×325 mesh The same size mold employed for Examples No. 1–20 was used, molding force was 8000 psi, and dwell time was 15 seconds to produce blocks 2.25 inches in length except Example 24 which was a 9.75 inch block manufactured by KX Corporation and subsequently cut to 2.25 inch blocks. The KX Corporation block comprised 85 percent carbon and 15 percent binder. A collapse test was conducted on 0.625 inch slices, cut from the 2.25 inch blocks, by compressing at a rate of 0.0238 inch/sec. The blocks had 1.75 inch O.D. and 0.375 inch I.D. Examples 21–23 were baked at 139° C. for the period cited in Table V. Methylene chloride reduction evaluations were conducted to evaluate efficiency of the various blocks. To a feed flow stream of 300 ml/min of Meriden, Conn. city water, methylene chloride was injected to a concentration of 300 ppb. Breakthrough concentration was set to be 15 ppb. After the experiment, collapse tests were conducted on 0.625 inch slices, cut from the 2.25 inch blocks, by compressing perpendicular to the axis at a rate of 0.0238 inch/sec. The results of both tests are presented in Table V.

TABLE V

CARBON BLOCK METHYLENE CHLORIDE REDUCTION AND COLLAPSE TESTING

| EXAMPLE NO. | BAKING TIME MIN. | THROUGHPUT AT 15 PPB, GALLON | COLLAPSE FORCE OF 0.625 INCH SLICE, LB |
|---|---|---|---|
| 21 | 25 | 20 | 67 |
| 22 | 45 | 26 | 110 |
| 23 | 55 | 14 | 94 |
| 24 (KX) | N/A | 24 | 79 |

Examples No. 25–29

The same formulation employed for Examples 21–23 was scaled up to make 290 gram blocks, 12 inches in length with a 1.75 inch O.D. and a 0.375 inch I.D. The isostatic compression process according to the preferred embodiment, was employed utilizing a rubber mold and compressed by hydraulic pressure at 2500 psi for 20 seconds. The blocks were subsequently baked for various times at 142° to 143° C., and then cut to 9.75 inch lengths for testing. AC fine test dust (ACFTD) was employed for three tests: gram life; turbidity reduction efficiency and, percentage particulate reduction at 0.6 GPM. Two 9.75 inch products of KX Corporation from different lots were evaluated (Examples No. 28 and 29). Collapse force tests were also conducted and have been reported in Table VI, with the other test results.

The definitions of the terms used in Table VI are as follows:
a. ΔP; Differential pressure (psid) across the filter at 0.6 GPM flow rate.
b. Gram life, ACFTD: The cumulative weight (in grams) of the AC fine test dust (ACFTD) fed to the filter when the differential pressure increased by 20 psi at 0.6 GPM flow rate.
c. Turbidity, NTU: Nephelometric turbidity units. Turbidity is a function of concentration and particle size of the suspended solids in water.
d. Percentage reduction of number of particles between 1–5 pm. The NSF (National Sanitation Foundation) Standard 42 is using minimum 85% reduction of this particle range for particulate reduction Class II rating.

flow resistance was measured at constant flow of air at the rate of 135 SCFH through a 0.625 inch slice of filter donuts. In these examples, both PE fiber and powder melted as binder materials and the effect of PP fiber reinforcement can be seen by comparing Example Nos. 31 to 33 (1 to 3% fiber) with No. 30 containing no fiber, namely, approximately a 50 to 60 percent increase in final product strength, as indicated by the collapse force test.

TABLE VII

CARBON BLOCK EXAMPLES AND PROPERTIES

| EX. NO. | % OF 3 DENIER ¼ INCH MINIFIBER PP FIBER | % OF 13040F PE FIBER | % OF FASP007 PE POWDER | % OF 3049 TYPE OF B&S CARBON | AIR FLOW RESISTANCE OF 0.625 INCH SLICE, INCH H₂O | COLLAPSE FORCE OF 0.625 INCH SLICE, LB |
|---|---|---|---|---|---|---|
| 30 | 0 | 4 | 11 | 85 | 75 | 97 |
| 31 | 1 | 4 | 11 | 84 | 68 | 144 |
| 32 | 2 | 4 | 11 | 83 | 67 | 162 |
| 33 | 3 | 4 | 11 | 82 | 59 | 168 |

Example No. 34

A 55 gram block was manufactured in a metal mold 2.4 inch O.D., 0.75 inch I.D., utilizing a molding force of 2000 lbs and the following ingredients:
   85% diatomaceous earth (Grefco, Dicalite 6000)
   6% PE fiber 13040F
   9% PE powder FASP007
The block was baked at 142° C. for 45 minutes.

Example No. 35

The formulation and mold specifications of Example No. 34 were repeated for Example 35 except an additional 2.00 grams of resin Kymene 557H (Hercules, 12.5 percent solids) was added. The porous structure was baked at 142° C. for 45 minutes.

TABLE VI

CARBON BLOCK ACFTD AND COLLAPSE TESTING

| EX. NO. | ΔP, PSI AT 0.6 GPM | GRAM LIFE ACFTD, G | TURBIDITY (NTU) REDUCTION EFFICIENCY, % | PARTICULATE REDUCTION 1–5 μM, % | BAKE TIME MIN. | ⅝ INCH SLICE COLLAPSE FORCE, LB. |
|---|---|---|---|---|---|---|
| 25 | 2.60 | 6.15 | 96.3–98.3 | 99.33–99.51 | 40 | 86 ± 7 |
| 26 | 2.00 | 5.11 | 95.1–97.4 | 97.45–99.56 | 45 | 90 ± 5 |
| 27 | 2.00 | 3.65 | 97.5–98.5 | 98.95–99.81 | 50 | 91 ± 5 |
| 28 (KX) | 6.60 | 3.20 | 96.8–97.9 | 99.54–99.86 | N/A | 124 ± 3 |
| 28 (KX) | 0.90 | 4.87 | 71.3–97.1 | 86.99–98.34 | N/A | 99 ± 9 |

Example 30–33

Four porous structures (carbon blocks) were manufactured utilizing the following ingredients shown in Table VII. The length was about 2.42 inch, the O.D. was 1.75 inch and the I.D. was 0.375 inch. The blocks were molded at 6,000 lb force, and baked at 141° C. for 45 minutes. The radial air Example No. 36

A 55 gram block was manufactured in a metal mold 2.40 inch O.D., 0.75 inch I.D., utilizing a molding force of 2000 lbs and the following ingredients:
   80% diatomaceous earth (Grefco, Dicalite 6000)
   5% Polypropylene (PP) fiber (MiniFiber Y600F)
   6% PE fiber 13040F
   9% PE powder FASP007
The block was baked at 142° C. for 45 minutes.

Example No. 37

A 55 gram block was manufactured in a metal mold 2.40 inch O.D., 0.75 inch I.D., utilizing a molding force of 6000 lbs and the following ingredients:

- 65% Carbon type 3049
- 4% PE fiber 13040F
- 11% PE powder FASP007
- 20% Diatomaceous earth (Grefco, Dicalite 6000)

The block was baked at 142° C. for 45 minutes.

Example No. 38

A 55 gram block was manufactured in a metal mold 2.40 inch O.D., 0.75 inch I.D., utilizing a molding force of 5000 lbs and the following ingredients:

- 85% Cuno MicroKlean grind dust composed of cured resinous binder and cellulosic fiber, sieved to 120–400 mesh
- 8% PE fiber 13040F
- 7% PE powder FASP007

The block was baked at 143° C. for 50 minutes.

Example No. 39

A 20 gram porous structure was manufactured in a metal mold 2.40 inch O.D., and 0.75 inch I.D., utilizing a molding force of 4000 lbs and the following ingredients:

- 23.5% Polypropylene fiber (Hercules, type T-153, 3 denier, 3 mm)
- 15.5% PE fiber 13040F
- 1.5% PE powder FA700 (Quantum)
- 59.5% Carbon Type 3049

The porous structure was baked at 140° C. for 50 minutes.

Example No. 40

A 15 gram porous structure was manufactured in a metal mold 2.40 inch O.D., and 0.75 inch I.D., utilizing a molding force of 6000 lbs and the following ingredients:

- 6.25% of PE powder FA700
- 31.25% of PE fiber 1304F
- 62.5% of polypropylene fiber (Microfibers, NAT)

The porous structure was baked at 141° C. for 45 minutes.

Example No. 41

A 55 gram porous structure was manufactured in a metal mold 2.40 inch O.D., and 0.75 inch I.D., utilizing a molding force of 6000 lbs and the following ingredients:

- 80% Carbon type 3049
- 8% PP fiber (MiniFiber Y600F)
- 12% PE powder FA700

The porous structure was baked at 141° C. for 45 minutes.

Example No. 42

A 20 gram porous structure was manufactured in a metal mold 2.40 inch O.D., and 0.75 inch I.D., utilizing a molding force of 6000 lbs and the following ingredients:

- 50% HDPE sheath/PP core multi-component fiber (BASF, B1657)
- 30% PP fiber (MiniFiber, Y600F)
- 20% PE powder FA700

The porous structure was baked at 141° C. for 45 minutes.

Example No. 43

A 20 gram porous structure was manufactured in a metal mold 2.40 inch O.D., and 0.75 inch I.D., utilizing a molding force of 6000 lbs and the following ingredients:

- 65% HDPE sheath/PP core multi-component fiber (BASF, B1657)
- 25% PE fiber 13040F
- 10% PE powder FA700

The porous structure was baked at 141° C. for 45 minutes.

Example No. 44

A 15 gram porous structure was manufactured in a metal mold 2.40 inch O.D., and 0.75 inch I.D., utilizing a molding force of 2000 lbs and the following ingredients:

- 70% PP fiber (Y600F)
- 30% PE powder FA700

The porous structure was baked at 141° C. for 45 minutes.

Example No. 45

A 20 gram porous structure was manufactured in a metal mold 2.40 inch O.D., and 0.75 inch I.D., utilizing a molding force of 6000 lbs and the following ingredients:

- 85% HDPE sheath/PP core multi-component fiber (BASF, B1657)
- 15% PE fiber 13040F The porous structure was baked at 141° C. for 45 minutes.

Example No. 46

A 20 gram porous structure was manufactured in a metal mold 2.40 inch O.D., and 0.75 inch I.D., utilizing a molding force of 6000 lbs and the following ingredients:

- 80% HDPE sheath/PP core multi-component fiber (BASF, B1657)
- 20% Polypropylene fiber Y600F (MiniFiber)

The porous structure was baked at 141° C. for 45 minutes.

Example No. 47

A 20 gram porous structure was manufactured in a metal mold 2.40 inch O.D., and 0.75 inch I.D., utilizing a molding force of 6000 lbs and the following ingredients:

- 100% HDPE sheath/PP core multi-component fiber (BASF, B1657)

The porous structure was baked at 141° C. for 45 minutes.

Example No. 48

A 55 gram porous structure was manufactured in a metal mold 2.40 inch O.D. and 0.75 inch I.D., utilizing a molding force of 6000 lb and the following ingredients:

- 84% Carbon type 3049
- 4% PE fiber (1304F)
- 1% PP fiber (MiniFiber Y600F)
- 11% PE powder FA700

The porous structure was baked at 141° C. for 45 minutes.

Example No. 49

A formulation of 66.5 g of Calgon's TOGC carbon (80×325 mesh), 28.5 g of Georgia Pacific GP 5485 phenolic resin powder, and 3 g of water were mixed with a Osterizer blender at the lowest speed for 30 seconds. Then 13 g of the mixture was molded into a block of 1.75 inch O.D., 0.375 inch I.D., 7/16 inch thick, and baked at 130° C. for 2 hours.

Example No. 50

Donut shaped 55 g filters were manufactured in a metal mold 2.40 inch O.D. and 0.75 inch I.D., utilizing a molding force of 4000 lb and the following ingredients:

60% Cuno MicroKlean grind dust composed of cured resinous binder and cellulosic fiber, sieved through 200 mesh 39.6% BTL Melamine-formaldehyde resin powder, grade 412

0.4% citric acid (solids), 8% solution

The porous structure was baked at 141° C. for 45 minutes.

The porous structures representing Examples No. 34 to 50 were tested against a slice of KX 1 M carbon block and are reported in Table VIII. The radial air flow resistance was measured at constant flow of air at the rate of 50 SCFH through a 0.625 inch slice of filter donuts.

The air flow resistance and collapse force measured for Examples 34 through 50 are presented in Table VIII.

TABLE VIII

| EXAMPLE NO. | AIR FLOW RESISTANCE, INCH $H_2O$ | COLLAPSE FORCE, LB |
|---|---|---|
| 34 | 49 | 12.9 |
| 35 | 51.1 | 26.3 |
| 36 | 48.2 | 25.6 |
| 37 | 30.6 | 36.5 |
| 38 | 22.6 | 15.9 |
| 39 | 10.9 | 64.2 |
| 40 | 10.8 | 106 |
| KX 1M Block | 56.5 | 59 |
| 41 | 25.3 | 93.7 |
| 42 | 2.9 | 62.3 |
| 43 | 8.3 | 192.7 |
| 44 | 61 | 162.1 |
| 45 | 4.7 | 171.9 |
| 46 | 1.7 | 40.5 |
| 47 | 0.9 | 54.8 |
| 48 | 50 | 147 |
| 49 | — | 90 |
| 50 | 11.2 | 143 |

Thus it should be evident that the process of the present invention is highly effective in the manufacture of porous structures. The invention is particularly suited for the production of carbon block structures e.g., filters, having high separation (filter) media weight and relatively low binder weight, but is not necessarily limited thereto. The process of the present invention can be employed with a variety of equipment, and component materials. Similarly, the separation media made according to the process need not be limited to powdered carbon media. Nor, is shape of form of the porous structures a limitation of the present invention inasmuch as flat sheets; flat structures; cylindrical structures, open at both ends or closed at one end and, virtually any geometrically shaped structures, solid as well as hollow, can be formed. Moreover, the exterior surfaces of the porous structures can be widely varied.

Based upon the foregoing disclosure, it should now be apparent that the use of the process described herein will carry out the objects set forth hereinabove. It is, therefore, to be understood that any variations evident fall within the scope of the claimed invention and thus, the selection of specific component materials can be determined without departing from the spirit of the invention herein disclosed and described. In particular, porous structures according to the present invention are not necessarily limited to those based oil carbon; nor, are the blocks necessarily limited to the preferred hollow core cylindrical shapes. Similarly, layered products are also included, derived from more than one component mixture and which provide at least two different separation properties or characteristics. Thus, the scope of the invention shall include all modifications and variations that may fall within the scope of the attached claims.

What is claimed is:

1. A process for the manufacture of porous structures comprising:

forming a dry mixture comprising a component providing primary separation capability, a component providing green strength reinforcement capability and, a component providing binding capability and selected from the group consisting of thermoplastic and thermosetting polymers;

delivering said mixture to a suitable surface and building a desired thickness thereof;

densifying said mixture into the form desired for said porous structure;

removing said densified porous structure from said surface;

binding said component providing said primary separation capability by heating said densified porous structure to a temperature of up to about 20° C. higher than the melting point of any said thermoplastic component providing binding capability.

2. A process for the manufacture of porous structures, as set forth in claim 1, wherein said step of forming includes the step of selecting first, second and third components, each said component providing one of said three capabilities.

3. A process for the manufacture of porous structures, as set forth in claim 1, wherein said step of forming includes the step of selecting two of said three components, which together provide said three capabilities.

4. A process for the manufacture of porous structures, as set forth in claim 1, wherein said step of forming includes the step of selecting one component providing said primary separation capability, said green strength reinforcement capability and said binding capability.

5. A process for the manufacture of porous structures, as set forth in claim 1, wherein said steps of delivering and densifying are conducted via compression tooling.

6. A process for the manufacture of porous structures, as set forth in claim 1, wherein said step of delivering includes the step of filling a mold with said mixture and said step of densifying is conducted by isostatic compression of said mixture into the shape of the porous structure, having sufficient green strength to be self-supporting.

7. A process for the manufacture of porous structures, as set forth in claim 6, including the additional step of providing a mandrel in said mold prior to said step of filling.

8. A process for the manufacture of porous structures, as set forth in claim 7, wherein said shape of the porous structure is cylindrical and said porous structure is hollow.

9. A process for the manufacture of porous structures, as set forth in claim 8 wherein said shape has a L/D ratio of at least about 3:1.

10. A process for the manufacture of porous structures, as set forth in claim 6, including the additional steps of filling said mold with at least a second dry mixture of said components around said porous structure; and isostatically compressing said second mixture around said porous structure, thereby providing a layered porous structure having sufficient green strength to be self-supporting.

11. A process for the manufacture of porous structures, as set forth in claim 10, wherein said additional steps are conducted after said step of removing and including the further step of returning said porous structure to said mold prior to said additional steps.

12. A process for the manufacture of porous structures, as set forth in claim 6, wherein said shape of the porous structure is cylindrical and including the additional steps of providing a mandrel within said mold and at least one cylindrical sleeve, concentric with said mandrel, said sleeve and said mandrel defining separate volumes and wherein said step of delivering includes the steps of filling the volume defined between the mold and said sleeve with a first dry mixture of components and filling the volume defined between said sleeve and said mandrel with a second dry mixture of components, different from said first; and removing said sleeve from said mold prior to said step of densifying.

13. A process for the manufacture of porous structures, as set forth in claim 12, including the additional steps of providing one or more additional cylindrical sleeves, concentric with said mandrel, said sleeves additional defining separate volumes and wherein said step of delivering includes the step of filling the volume defined between adjacent sleeves with a second dry mixture of components; and removing said sleeves from said mold prior to said step of densifying.

14. A process for the manufacture of porous structures, as set forth in claim 6, wherein said shape of the porous structure is cylindrical and including the additional steps of providing a mandrel within said mold; and filling the volume defined between the mold and said mandrel with at least first and second dry mixtures of components in concentric layers around said mandrel, prior to said step of densifying, said second dry mixture of components being different from said first.

15. A process for the manufacture of porous structures, as set forth in claim 14, including the additional steps of filling said mold with at least a third dry mixture of said components around said porous structure; and isostatically compressing said second mixture around said porous structure, thereby providing a layered porous structure having sufficient green strength to be self-supporting.

16. A process for the manufacture of porous structures, as set forth in claim 15, wherein said additional steps are conducted after said step of removing and including the further step of returning said porous structure to said mold prior to said additional steps.

17. A process for the manufacture of porous structures, as set forth in claim 1, wherein said step of delivering includes the step of applying said mixture onto a flat support surface and said step of densifying includes the step of pressing said delivered mixture into a sheet of reduced thickness, having sufficient green strength to be self-supporting.

18. A process for the manufacture of porous structures, as set forth in claim 17, including the additional step of applying at least a second dry mixture of components onto said first delivered mixture, prior to said step of densifying.

19. A process for the manufacture of porous structures, as set forth in claim 17, including the additional steps of applying at least a second mixture, different from said delivered mixture, onto said densified sheet and pressing said second delivered mixture and said densifed sheet into a layered sheet of reduced thickness, having sufficient green strength to be self-supporting.

20. A process for the manufacture of porous structures, as set forth in claim 19, including the additional step of cutting desired shapes of porous structures from said sheet of reduced thickness.

21. A process for the manufacture of porous structures, as set forth in claim 1, wherein said component providing primary separation capability is selected from the group consisting of carbon particles, diatomaceous earth, perlite, activated alumina, silica, zeolites, natural fibers, and man-made fibers.

22. A process for the manufacture of porous structures, as set forth in claim 21, wherein said natural fibers are selected from the group consisting of cellulose, wool, jute, hemp and said man-made varieties are selected from the group consisting of fibers made of polyolefins, polyesters, carbon, graphite, glasses, acrylics, rayons, nylons, aramids, multi-component fibers and mixtures thereof.

23. A process for the manufacture of porous structures, as set forth in claim 1, wherein said component providing green strength reinforcement is selected from the group consisting of fibers selected from the group consisting of polyolefins, polyesters, nylons, aramids, rayons and mixtures thereof and liquid green strength agents and mixtures thereof.

24. A process for the manufacture of porous structures, as set forth in claim 23, wherein said liquid green strength agents are selected from the group consisting of styrene-butadiene, poly(ethylene-vinyl acetate), and acrylate latexes; methyl-cellulose and hydroxypropyl methyl-cellulose, carboxymethyl cellulose, hydroxyethyl cellulose; polyvinyl alcohol; polyvinyl pyrrolidone; polyacrylic acid; polyethylene oxide; polyethyleneimine; polyacrylamide; natural gums and copolymers thereof; water and mixtures with one or more of the foregoing liquid green strength agents.

25. A process for the manufacture of porous structures, as set forth in claim 1, wherein said thermoplastic and thermosetting polymer component providing binding capability is selected from the group consisting of polyolefin, epoxy, phenol-formaldehyde and melamine-formaldehyde resin powders and polyolefin fibers.

26. A process for the manufacture of porous structures, as set forth in claim 1, including the additional step of adding an optional component selected from the group consisting of cationic charged resins, ion-exchange materials, perlite, diatomaceous earth, activated alumina, zeolites, resin solutions, latexes, metallic materials and fibers, cellulose, carbon particles, carbon fibers, rayon fibers, nylon fibers, polypropylene fibers, polyester fibers, glass fibers, steel fibers and graphite fibers, including mixtures thereof in an amount ranging from about 0.1 to about 90 percent by weight, with an attendant decrease in the amount of primary media.

27. A process for the manufacture of porous structures, as set forth in claim 1, including the additional step of cationically charging said optional component selected from the group consisting of perlite, diatomaceous earth, activated alumina, zeolites, cellulose, rayon fibers, nylon fibers and carbon particles.

28. A process for the manufacture of porous structures, as set forth in claim 27, wherein said step of cationically charging said optional component is conducted prior to said step of forming and including the additional step of adding said cationically charged component to said mixture.

29. A process for the manufacture of porous structures, as set forth in claim 1, wherein the desired form created by said step of densifying said mixture is a flat layer.

30. A process for the manufacture of porous structures, as set forth in claim 29, including the additional steps of forming at least a second mixture of said components; densifying said second mixture to form a flat layer and combining said layers to form a multiple layered product.

31. A process for the manufacture of porous structures, as set forth in claim 1, including the additional step of cationically charging any of said components, providing one or more of said three capabilities which comprise particulate media.

* * * * *